(12) United States Patent
Sabri

(10) Patent No.: US 11,587,010 B2
(45) Date of Patent: *Feb. 21, 2023

(54) COMPUTER-BASED INFORMATION MANAGEMENT SYSTEM CONFIGURED FOR AUTOMATED AND DYNAMIC ACCOUNT ANALYSIS AND METHODS THEREOF

(71) Applicant: BankCard Services, LLC, Las Vegas, NV (US)

(72) Inventor: Hanan Sabri, Las Vegas, NV (US)

(73) Assignee: BankCard Services, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,498

(22) Filed: Jun. 3, 2022

(65) Prior Publication Data

US 2022/0292419 A1    Sep. 15, 2022

Related U.S. Application Data

(63) Continuation of application No. 17/314,106, filed on May 7, 2021, now Pat. No. 11,379,775.

(60) Provisional application No. 63/051,636, filed on Jul. 14, 2020.

(51) Int. Cl.
| | |
|---|---|
| *G06Q 10/06* | (2012.01) |
| *G06F 11/34* | (2006.01) |
| *A63F 13/79* | (2014.01) |
| *G06F 11/30* | (2006.01) |
| *G06F 17/18* | (2006.01) |

(Continued)

(52) U.S. Cl.
CPC ......... *G06Q 10/0635* (2013.01); *A63F 13/79* (2014.09); *G06F 11/3006* (2013.01); *G06F 11/3438* (2013.01); *G06F 11/3452* (2013.01); *G06F 17/18* (2013.01); *G06Q 20/36* (2013.01)

(58) Field of Classification Search
CPC ..... G06Q 10/0635; A63F 13/79; G06F 17/18; G06F 11/3006; G06F 11/3438; G06F 11/3452

See application file for complete search history.

(56) References Cited

U.S. PATENT DOCUMENTS

| | | | |
|---|---|---|---|
| 2019/0180558 A1* | 6/2019 | Merati | G06Q 20/3678 |
| 2020/0250633 A1* | 8/2020 | Vinson | G06Q 20/3676 |
| 2020/0387891 A1* | 12/2020 | Paschini | G06Q 20/3678 |

* cited by examiner

*Primary Examiner* — Nam T Tran
(74) *Attorney, Agent, or Firm* — Greenberg Traurig LLP; Chinh H. Pham; Kristopher D. Reichlen

(57) ABSTRACT

Systems and methods of the present disclosure enable user-level activity recordation using population level activity data by receiving operator data including a record of activities performed by users on an operator system. Each entry in the record of activities is parsed to form structured activity entries representing each activity executed on the operator system. Each entry in the record of activities is matched to an individual account in an account database based on an individual identifier of each entry and an account individual identifier identifying the individual account. A statistical metric representing the activity history of the individual account is produced based on each entry matched to the individual account, and an activity history dashboard is displayed on an operator computing device to depicts the statistical metric for the individual account.

20 Claims, 20 Drawing Sheets

(51) Int. Cl.
*G06Q 20/36* (2012.01)
*G06Q 10/0635* (2023.01)

| YEAR MONTH | NET FUNDING ACCOUNTS OPENED | TOTAL FUNDING ACCOUNTS ATEOM | LOAN COUNT (funded account) | LOAN AMOUNT (funded account) | LOAN AMOUNT per EOM ACCOUNTS | FUNDING ACCOUNT BALANCE | FUNDING ACCOUNT BALANCE per EOM ACCOUNTS | FUNDING ACCOUNTS w/ loan from Account | % | LOANS % from Auto Account | % |
|---|---|---|---|---|---|---|---|---|---|---|---|
| 2019-10 | 22,531 | 22,531 | 25,228 | 2,138,974 | 95 | $ 1,311,246 | $ 58 | 13,972 | 62% | $ 2,167,899 | 85% |
| 2019-11 | 7,994 | 30,525 | 41,922 | 3,325,234 | 109 | $ 1,800,282 | $ 59 | 15,403 | 50% | $ 1,557,109 | 46% |
| 2019-12 | 6,798 | 37,323 | 51,858 | 4,305,873 | 115 | $ 2,118,897 | $ 57 | 16,862 | 45% | $ 1,944,638 | 45% |
| 2020-01 | 7,262 | 44,585 | 57,375 | 4,883,384 | 109 | $ 2,310,918 | $ 52 | 21,049 | 47% | $ 2,752,822 | 56% |
| 2020-02 | 3,962 | 48,547 | 48,271 | 3,998,734 | 82 | $ 2,282,692 | $ 47 | 22,295 | 47% | $ 2,033,528 | 50% |
| 2020-03 | 542 | 49,089 | 23,675 | 1,888,429 | 38 | $ 1,769,433 | $ 36 | 22,846 | 47% | $ 864,920 | 46% |
| 2020-04 | 271 | 49,360 | 11,528 | 977,231 | 20 | $ 1,657,508 | $ 34 | 22,947 | 46% | $ 435,645 | 45% |
| 2020-05 | 498 | 49,858 | 17,645 | 1,546,159 | 31 | $ 1,711,192 | $ 34 | 23,157 | 46% | $ 776,022 | 50% |
| 2020-06 | 567 | 50,425 | 21,418 | 1,880,042 | 37 | $ 1,718,799 | $ 34 | 23,384 | 46% | $ 827,193 | 46% |
| 2020-07 | 1,369 | 51,794 | 32,669 | 3,061,335 | 59 | $ 2,073,893 | $ 40 | 23,791 | 46% | $ 1,383,358 | 45% |
| 2020-08 | 2,384 | 54,178 | 51,819 | 5,099,582 | 94 | $ 2,279,050 | $ 42 | 24,151 | 45% | $ 1,791,992 | 35% |
| 2020-09 | 3,930 | 58,108 | 60,734 | 6,022,830 | 104 | $ 3,298,846 | $ 57 | 24,494 | 42% | $ 1,956,988 | 32% |
| 2020-10 | 2,535 | 60,643 | 66,543 | 6,480,044 | 107 | $ 2,806,543 | $ 46 | 21,688 | 36% | $ 1,983,623 | 33% |
| 2020-11 | 1,517 | 62,160 | 67,381 | 6,211,072 | 100 | $ 2,753,085 | $ 44 | 19,986 | 32% | $ 1,983,630 | 32% |
| 2020-12 | 1,549 | 63,709 | 75,966 | 6,807,565 | 107 | $ 2,954,678 | $ 46 | 19,296 | 30% | $ 2,164,839 | 32% |
| 2021-01 | 3,063 | 66,772 | 90,360 | 8,488,028 | 127 | $ 2,957,302 | $ 44 | 17,992 | 26% | $ 2,646,552 | 31% |
| 2021-02 | 3,205 | 69,977 | 76,218 | 6,751,845 | 96 | $ 3,164,807 | $ 45 | 16,150 | 23% | $ 1,646,330 | 24% |
| 2021-03 | - | - | - | - | n/a | - | n/a | - | n/a | - | n/a |
| 2021-04 | - | - | - | - | n/a | - | n/a | - | n/a | - | n/a |
| 2021-05 | - | - | - | - | n/a | - | n/a | - | n/a | - | n/a |
| 2021-06 | - | - | - | - | n/a | - | n/a | - | n/a | - | n/a |
| 2021-07 | - | - | - | - | n/a | - | n/a | - | n/a | - | n/a |
| 2021-08 | - | - | - | - | n/a | - | n/a | - | n/a | - | n/a |
| 2021-09 | - | - | - | - | n/a | - | n/a | - | n/a | - | n/a |
| 2021-10 | - | - | - | - | n/a | - | n/a | - | n/a | - | n/a |
| 2021-11 | - | - | - | - | n/a | - | n/a | - | n/a | - | n/a |
| 2021-12 | - | - | - | - | n/a | - | n/a | - | n/a | - | n/a |
| TOTAL | 69,977 | | 820,810 | $ 73,864,363 | | | | | | $ 28,881,326 | 39% |
| 2019 | | | 119,008 | $ 9,770,081 | | | | | | $ 5,759,382 | |
| 2020 | | | 534,624 | $ 48,954,409 | | | | | | $ 18,796,939 | |
| 2021 | | | 167,178 | $ 15,239,873 | | | | | | $ 4,293,083 | |

FIG. 5C

COMPUTER-BASED INFORMATION MANAGEMENT SYSTEM CONFIGURED FOR AUTOMATED AND DYNAMIC ACCOUNT ANALYSIS AND METHODS THEREOF

CROSS-REFERENCE TO RELATED APPLICATION

This application is a continuation patent application of U.S. application Ser. No. 17/314,106, filed May 7, 2021, which claims priority to and the benefit of U.S. Provisional Patent Application No. 63/051,636, filed Jul. 14, 2020, each of which are incorporated herein by reference in their entireties.

BACKGROUND OF TECHNOLOGY

Typically, gaming ecosystems include a gaming operator layer, a platform provider layer and a banking layer. The platform provider layer typically provides record keeping systems and services for transactions at the gaming operator layer, thus maintaining a ledger of player funds. The platform provider then uses the banking layer to manage the funds, typically in one large commingled account for each gaming operator, or one large commingled account for all gaming operators managed by the platform provider in the platform provider layer. However, there is no management of funds on the player level, thus preventing compliance, risk and insurance analysis at the player level.

SUMMARY OF THE DISCLOSURE

Embodiments of the present disclosure may include a system for granular user data management. The system may include at least one information management processor configured to execute software instructions. The software instructions cause the at least one information management processor to perform steps to: receive operator data from at least one operator system, the operator data comprising a record of activities performed by users on the at least one operator system; parse each entry of a plurality of entries in the record of activities to form structured activity entries representing each activity executed on the at least one operator system; match each entry of the plurality of entries in the record of activities to at least one individual account in an account database based on at least one individual identifier of each entry and an account individual identifier identifying the at least one individual account; generate at least one statistical metric representing at least one activity history of the at least one individual account based on each entry of the plurality of entries matched to the at least one individual account; and display an activity history dashboard on a display of at least one operator computing device, wherein the activity history dashboard depicts the at least one statistical metric for the at least one individual account.

Embodiments of the present disclosure may include a method for granular user data management. The method may include receiving, the at least one information management processor, operator data from at least one operator system, the operator data comprising a record of activities performed by users on the at least one operator system; receiving, the at least one information management processor, operator data from at least one operator system, the operator data comprising a record of activities performed by users on the at least one operator system; parsing, the at least one information management processor, each entry of a plurality of entries in the record of activities to form structured activity entries representing each activity executed on the at least one operator system; matching, the at least one information management processor, each entry of the plurality of entries in the record of activities to at least one individual account in an account database based on at least one individual identifier of each entry and an account individual identifier identifying the at least one individual account; generating, the at least one information management processor, at least one statistical metric representing at least one activity history of the at least one individual account based on each entry of the plurality of entries matched to the at least one individual account; and displaying, the at least one information management processor, an activity history dashboard on a display of at least one operator computing device, wherein the activity history dashboard depicts the at least one statistical metric for the at least one individual account.

Embodiments of the present disclosure may include a non-transitory computer readable medium having software instructions stored thereon, with the software instructions configured to instruct a processor to perform steps for granular user data management. The steps may include receiving operator data from at least one operator system, the operator data comprising a record of activities performed by users on the at least one operator system; receiving operator data from at least one operator system, the operator data comprising a record of activities performed by users on the at least one operator system; parsing each entry of a plurality of entries in the record of activities to form structured activity entries representing each activity executed on the at least one operator system; matching each entry of the plurality of entries in the record of activities to at least one individual account in an account database based on at least one individual identifier of each entry and an account individual identifier identifying the at least one individual account; generating at least one statistical metric representing at least one activity history of the at least one individual account based on each entry of the plurality of entries matched to the at least one individual account; and displaying an activity history dashboard on a display of at least one operator computing device, wherein the activity history dashboard depicts the at least one statistical metric for the at least one individual account.

Embodiments of the present disclosure may further include determining a risk of each individual account based on a reconciliation of the record of activities; and displaying the risk of each individual account in the activity history dashboard on the display of the at least one operator computing device.

Embodiments of the present disclosure may further include determine a compliance of each individual account based on a compliance management of the record of activities; and displaying the compliance of each individual account in the activity history dashboard on the display of the at least one operator computing device.

Embodiments of the present disclosure may further include generating a deposit performance of each operator system of the at least one operator system and each individual account based on the record of activities; and displaying the deposit performance of each operator system and each individual account in the activity history dashboard on the display of the at least one operator computing device.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Figure 1:
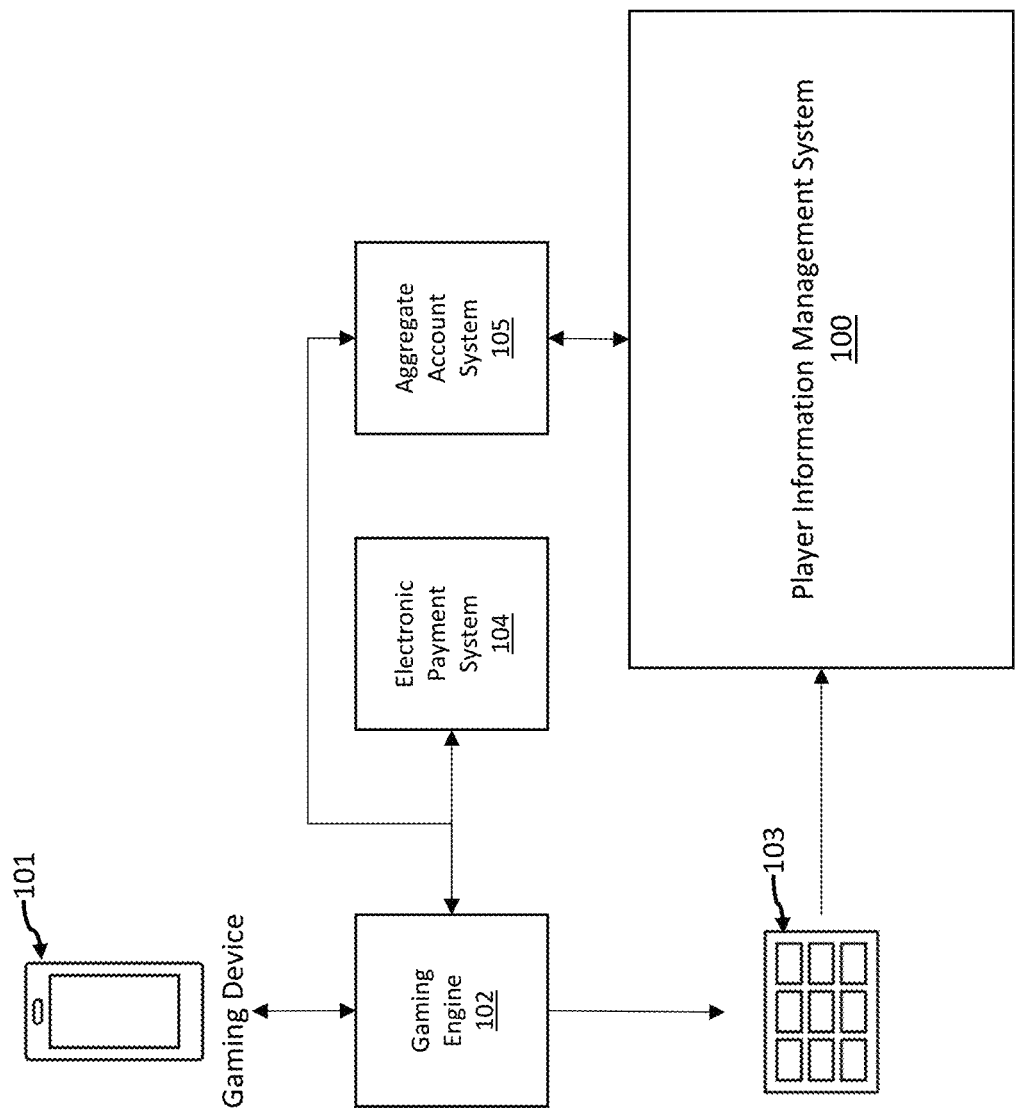
FIGS. 1-10 show one or more schematic flow diagrams, certain computer-based architectures, and/or screenshots of various specialized graphical user interfaces which are illustrative of some exemplary aspects of at least some embodiments of the present disclosure.

FIG. 1 illustrates a player information management system (PIMS) 100 for gaming and player tracking in accordance with one or more embodiments of the present invention. In some embodiments, a gaming device 101 and a gaming engine 102 provide gaming data 103 to the PIMS 100 for management of the player information associated with transactions in the gaming data 103. The gaming device 101, the gaming engine 102, the aggregate account system 105 and PIMS 100 can be communicatively attached through a combination of systems and methods for exchanging and storing gaming data, as discussed in greater detail herein.

In some embodiments, a gaming engine 102 can facilitate recording gaming transactions from a gaming device 101 by providing functionality for gaming, such as, e.g., gaming software, communications protocols, betting software, among other functionalities as a gaming platform. For example, gaming platforms such as, e.g., Chameleon™ by SB Tech, or similar platforms from, e.g., International Gaming Technology (IGT®), or other gaming platform vendors. In some embodiments, the gaming engine 102 can be a platform situated between the gaming device 101 and the PIMS 100 to record transactions of user activity from the gaming device 101. For example, in some embodiments, the gaming engine 102 may provide functionality to the gaming device 101 to, e.g., make a requested sporting or gaming event available for wagering, such as by showing applicable odds, money line and/or other relevant information. In some embodiments, the player may engage with the gaming device 101 to request a transaction associated with the requested sporting or gaming event to, e.g., place wagers or request other transaction (e.g., deposits into a player account, withdrawals from a player account, etc.) via the gaming engine 102. The gaming engine 102 functionality can be completely external to PIMS 100 and/or may be linked to the gaming device 101 to receive files for review, processing, analytics, etc.

In some embodiments, the gaming device 101 can provide the gaming interface for a user interacting with a gaming platform with functionality to, e.g., player on-boarding, creating a wagering account, interacting with various gaming features including initiating transactions, among other functionality. The gaming engine 102, therefore provides a transaction recordation platform to execute the functions initiated by a user with a gaming device 101. The user interactions with the gaming device 101 can include any combination of interactions by a player, a service provider to the player, and/or an observer of a player activity. As a result of the gaming transactions by gaming devices 101 on the gaming engine 102, transactions are executed, resulting in a generation of gaming data 103, including individual player balance data, gaming operator data, among other balance data for parties involved in gaming transactions.

In some embodiments, the gaming device 101 may be a device used for gaming interactions, such as, e.g., online gaming or esports, among others or any combination thereof. The player may use the gaming device 101 to interact with the gaming interface and sign up to the gaming platform through the gaming operator's platform or application. Signing up may include, e.g., establishing an account on the gaming platform, entering peer-to-peer tournaments, games or other activities with one or more additional players, or other form of signing up such that the player may engage in the gaming interactions over the gaming platform.

In some embodiments, the gaming engine 102 may provide functionality for requesting account activities, gaming transactions, among other activities in relation to one or more gaming operators served by the gaming engine 102. For example, the gaming engine 102 can request transactions amongst player accounts for gaming activities resulting from user interactions with the gaming device 101. In some embodiments, a gaming operator can include, e.g., any entity that engages in gaming, such as, e.g., lotteries, casinos, online gaming platforms, among others. Moreover, the gaming operator can also include non-gaming entities, such as, e.g., financial institutions, payment ecosystems, trading platforms, online retailers and marketplaces, virtual currency-based platforms, among other transaction-related entities. However, the gaming operator, including the gaming engine 102 may not manage the player accounts themselves, but rather provides gaming services, including interfacing with betting line systems, and the electronic payment system 104.

In some embodiments, the gaming engine 102 may generate a record of the activities, such as transactions, account creation, account activities, among others, to produce the gaming data 103. An API interface from gaming engine 102 that gaming device 101 uses that aggregates everything gaming device 101 does and then gaming engine 102 sends this gaming data (103) to PIMS 100. In some embodiments, the gaming engine 102 receives the activities performed at each gaming device 101 in communication with the gaming engine 102 via, e.g., an API. In some embodiments, the API aggregates every activity performed by each gaming device 101 to produce the gaming data 103, forming a record of all activities performed across a gaming platform operated by the gaming engine 102. The gaming data 103 may be relayed to the PIMS 100 to manage a ledger (eWallet) associated with funds and account balances for each player. In some embodiments, the gaming data 103 may be communicated from the gaming engine 102 to the PIMS 100, e.g., periodically (every day, every night, every 12 hours, every 8 hours, every week, every two weeks, every month, etc.) or continuously (e.g., in a continuous stream). Thus, in some embodiments, a messaging brokering, or messaging pattern may be employed for batch or stream communication. In some embodiments, a publish-subscribe pattern can be used where the PIMS 100 subscribes to gaming data 103, e.g., based on data descriptors, such as, e.g., wallet type, player name, player identifier (ID), gaming operator name, gaming operator ID, or other descriptor. As a result, the gaming engine 102 may periodically publish updated gaming data 103 to the PIMS 100 in, e.g., a batch or stream. Alternatively, the PIMS 100 may explicitly request the gaming data 103 on a batch or streaming basis, e.g., via application programming interface (API), or other protocol.

In some embodiments, the gaming data 103 may include any suitable data to represent interactions performed over the gaming platform, including, e.g., gaming activities, transactions, peer-to-peer activities, among others or any combination thereof. In some embodiments, the gaming data 103 may include, e.g., transactional information (such as a player ID, transaction type, transaction ID, transaction amount, balance before and after the transaction, etc.), player information (such as player ID, balance at the beginning of the day, balance at the end of the day, overdrawn balance, open interactions, locked funds, first name, last name, date of birth, physical address, email address, account status, Office of Foreign Assets Control (OFAC) results, etc.), among other gaming data 103 or any combination thereof.

In some embodiments, the gaming system 102 may also interface with an electronic payment system 104 and an aggregate account system 105. In some embodiments, the gaming engine 102 utilizes the electronic payment system 104 to facilitate particular transactions, such as deposits into player accounts, as recorded in the eWallet for each player maintained in the PIMS 100. Accordingly, the gaming system 102 may utilize, e.g., application programming interfaces (API) to facilitate controlling fund movement from the electronic payment system 104 to the gaming engine 102.

In some embodiments, funds from the gaming engine 102 (e.g., funds deposited using the electronic payment system 104), may be held and managed in an aggregate account system 105, e.g., at a bank or other financial institution. However, in some embodiments, the funds are held in an aggregate account associated with the gaming engine 102. Thus, the aggregate account system 105 does not have any visibility and maintains no records for transactions amongst players with accounts in the gaming engine 102. For example, individual wagers, transfers, deposits, withdrawals, etc. at the player level may not appear as transactions in the records of the aggregate account system 105.

Therefore, in some embodiments, the PIMS 100 may provide ledgers (e.g., eWallets) at the player level to supplement the aggregate account system 105. In some embodiments, the eWallets may be maintained at the player level based on the gaming data 103 provided by the gaming engine 102. The gaming engine 102 may record individual transactions across a gaming platform or gaming system, including, e.g., recording a transaction date and time, transaction type, transaction operation, player identifiers associated with the transactions, among other attributes of each transaction. The gaming engine 102 may record the transactions as part of a global record of transactions across the platform. The gaming engine 102 may also, or alternatively, maintain player accounts for each player, including transactions and fund balances attributable to the respective player of each player account. However, the transactions in the gaming data 103 do not provide an accounting of player transactions as a ledger, including any compliance, reconciliation, fraud or risk checks. Rather, in some embodiments, the PIMS 100 is employed between the gaming engine 102 and the aggregate account system 105 to manage player-level ledgers for player-level accounting. Thus, the PIMS 100 receives the gaming data 103 and correlates each transaction to the associated players. Based on the attributes of each transaction, the PIMS 100 may record transactions for each player in a ledger associated with each player to record insurable balance-related data in an eWallet of each player.

In some embodiments, while the gaming engine 102 has electronic wallets for each player and the aggregate account system 105 includes an aggregate or omnibus account holding the funds, the PIMS 100 may provide the player-level ledgers. The electronic wallets of the gaming engine 102 may include "in" and "out" (or "deposit" and "withdraw", respectively) entries according to player instruction, such entries do not track balances, transaction types, parties transacted with, etc. Accordingly, the PIMS 100 may use the player ID of each electronic wallet and the "in" and "out" entries to account for player-level balances and transaction data. Thus, the PIMS 100 provides a layer for a physical cash wallet at the bank for physical deposit or withdrawal to and from a bank account for the player within the aggregate account system 105.

In some embodiments, based on the ingested gaming data 103, the PIMS 100 may fully manage and provide a ledger for player accounts at the individual level. Typically, in conventional systems and methods player accounts are not individually accounted for because gaming platforms, such as the gaming engine 102, do not maintain ledgers at the player level because all funds are comingled in an account associate with each operator. In this configuration, the traditional systems and methods are not capable of granular account reconciliation and compliance, because conventional banking systems do not have access to the individual player wallets. The PIMS 100, however, provides a platform layer to maintain player-level ledgers for tracking transactions at the player level, including credit/account data for each player based on gaming data 103. Accordingly, in some embodiments, the PIMS 100 may utilize the ingested gaming data 103 to perform transaction reconciliation, ensure transaction, player, and operator compliance, generate balance analytics on both the operator and the player levels, and maintain a ledger of player activity, as well as other tasks, such player account creation.

For example, in some embodiments, the PIMS 100 may receive gaming data 103 including an account creation transaction to open a ledger account for a particular player. In some embodiments, a ledger account for a particular player may be created by a player opening a player account, e.g., with the gaming system 102. The player account may be a credit-based account, however, in some embodiments, the player account includes a pre-paid account such that a player must load a player account with funds before engaging in gaming activities. The loading of the player account may then be tracked in the PIMS 100 via the player's corresponding ledger account maintained by the PIMS 100.

In some embodiments, the account creation transaction may be performed using a suitable protocol. In some embodiments, the Customer Information Profile (CIP) is used to onboard players upon signing up with the gaming platform. Signing up may produce the account creation transaction, which in turn produces the CIP for the new player. In some embodiments, the CIP may include, e.g., the player's name, address, last four digits of a social security number, etc. The PIMS 100 may receive the CIP for the new player and determine whether the new player is new or existing in PIMS by performing, e.g., a search or query for the CIP. In some embodiments, where the new player is new in the PIMS 100, the PIMS 100 may generate a new account for the new player according the CIP. Thus, a new ledger account or player's account is automatically opened in the aggregate account system 105 via the PIMS 100 in response to signing up with the gaming platform. However, where the new player already exists in the PIMS 100, the player's account may be linked to the gaming platform, e.g., via mapping the player ID to the player's account or by some other suitable technique such that later transactions are recorded by the player's account in the PIMS 100.

In some embodiments, the account creation transaction as well as other transactions in the gaming data 103 may be provided to the PIMS 100 in a suitable data structure. For example, the gaming data 103 may convey transactions using, e.g., comma-separated values (CSV) text files, tables, arrays, or any other suitable structured or unstructured data format or any combination thereof.

The gaming data 103, therefore, may include descriptors related to the ledger account creation, such as, e.g., a new account ID, player data (e.g., name, address, social security number, etc.), a transaction including, e.g., a balance load (e.g., deposit) into the ledger account, among other descriptors. In some embodiments, the gaming data 103 associated with the creation of the new ledger account may not include the player data, but may include, e.g., a unique player ID or account ID, which may be cross-referenced with an account created in the aggregate account system 105, e.g., at a bank. In some embodiments, the account may be created in the aggregate account system 105 by the gaming engine 102 during an on-boarding, or directly at the aggregate account system 105, e.g., by an associated financial institution (e.g., bank). In some embodiments, player accounts for a unique player can include opening a bank account unique to that player and a particular operator in the aggregated account system 105. For example, a unique player (e.g., associated with a unique social security number (SSN)) may have separate bank accounts for each operator in which they have an account. The aggregate account system 105 can maintain accounts for funds for each player based on the corresponding ledger accounts maintained in the PIMS 100 for reconciliation, risk assessment, compliance management, data analytics, etc. Creating individual accounts for players with a financial institution can enable gaming activities for individual players to be tracked a granular level. Thus, using the PIMS 100, the players may be identified at the ledger level for player-specific fund allocation in the aggregate account system 105.

In some embodiments, once a player has a financial account, a balance of the financial account at a bank (e.g., at the aggregate account system 105) may be managed by the PIMS 100 according to the corresponding ledger account maintained in the PIMS 100 using the gaming data 103. In some embodiments, the financial account is, e.g., maintained by the aggregate account system 105 such that the PIMS 100 may attribute each transaction performed by a player account and recorded in the gaming data 103 to the associated ledger accounts of the PIMS 100 for the management of funds in the financial accounts of the aggregate account system 105. Thus, the PIMS 100 may provide a financial institution, e.g., a bank, controlling the aggregate account system 105 with compliance, reconciliation, and analytics functionality to provide banking services at the player level and the operator level, rather than only at the operator level. Thus, the financial institution can act as a custodian managing player accounts. Specifically, with players having individual player accounts with a financial institution, the PIMS 100 may also leverage bank information for each player, such as, e.g., by importing social security numbers from the bank for each wallet, importing risk ratings and credit ratings, among other financial data for holistic player-level financial assessment.

In some embodiments, the aggregate account system 105 may maintain the player accounts. By providing account data on the player level, the PIMS 100 enables each player account to be verified for, e.g., compliance, risk, credit, reconciliation, etc. Accordingly, financial services, such as, e.g., Federal Deposit Insurance Corporation (FDIC) insurance, mobile account transactions, etc., may be provided to each ledger account. In some embodiments, each player may have an associated ledger account for a particular gaming engine 102. Thus, each operator associated each gaming engine 102 may also be insured because the wallets are specifically attributable to a particular operator.

FIGS. 2A-6B illustrate a player information management system and architecture in accordance with one or more embodiments of the present invention.

Referring to FIGS. 2A, 2B, and 3A-3F, in some embodiments, the gaming data 103 may be ingested by the PIMS 100 using an import processor 110 to convert the data formatting of the gaming data 103 to a structured format. In some embodiments, the gaming data 103 can be provided in any combination of data formats and can be organized to include any combination data recorded by the gaming device 101 and gaming engine 102. For example, the gaming data 103 may be flat file, such as, e.g., an SMTP file including a text file using, e.g., comma separated values (CSV) or other separation method. As a result, in some embodiments, the PIMS 100 may employ the import processor 110 to ingest the gaming data 103 and convert it into a structured, searchable, and filterable form. For example, based on, e.g., the commas in a CSV text file, the import processor 110 may generate a record including descriptors such as, e.g., wallet type, account number, account holder name, transaction type, transaction amount, operation type, among other descriptors for transaction. In some embodiments, the import processor 110 may convert the flat file into a structured data type using, e.g., a set of conversion rules customized for the gaming engine 102. Thus, for each additional gaming engine 102 supplying data to the PIMS 100, the import processor 110 may maintain and utilize a gaming system specific set of data parsing rules to convert the gaming data 103 from each particular gaming engine 102 to the PIMS 100 structured data type, e.g., a table, a tuple, or other suitable table, for each transaction. The result of the conversion of the gaming data 103 can create a standardized ingested gaming data 103 for use by the components and functions within the PIMS 100.

Figure 2A:
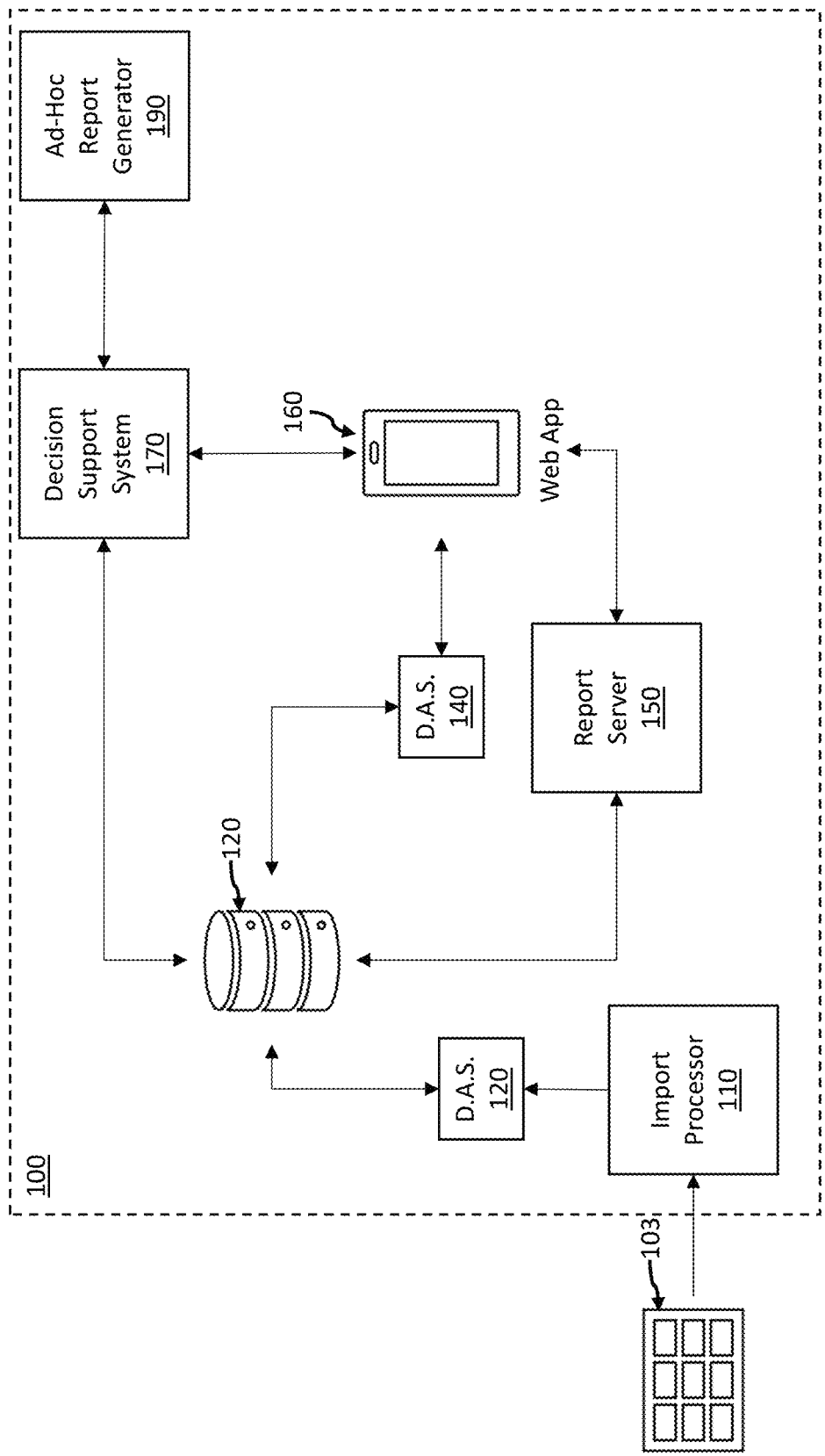
Figure 2B:
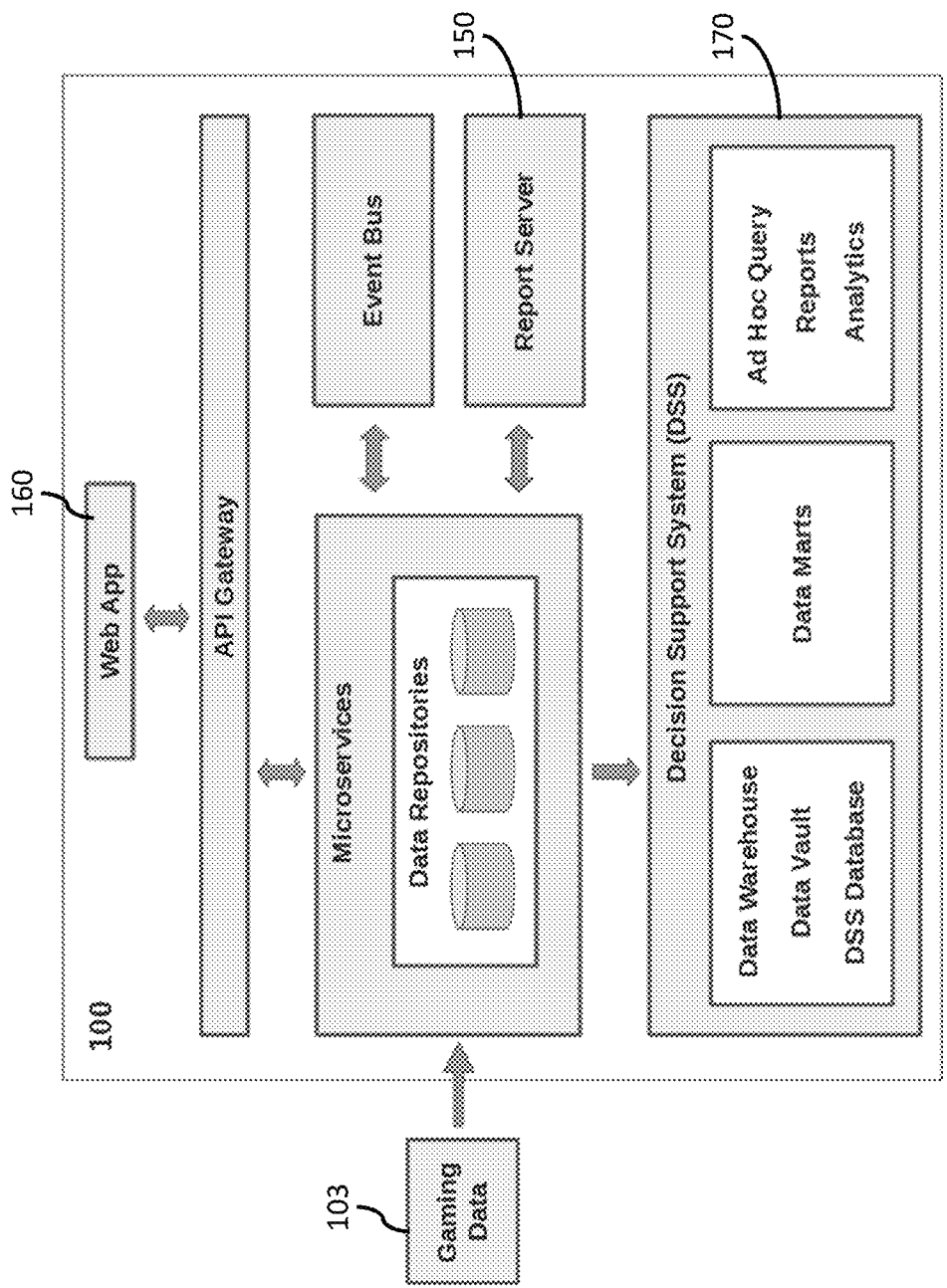

Referring to FIG. 2B, in some embodiments, the gaming data 103 may be ingested by the PIMS 100 using one or more microservices each including their own data repositories. For example, the PIMS 100 may include microservices for, e.g., Download services, CSV services, player services, transaction services, among other suitable services for performing specific individual functions. Once the gaming data 103 has been provided to the one or more microservices, it can be provided to an event bus, a report server 150, a decision support system 170, or a combination thereof for additional processing, as discussed in greater detail herein. In some embodiment, a web application 160 can be provided to access the data within the PIMS 100 using an API gateway. The API gateway can manage access to the data within the data repositories and/or throughout the PIMS 100. For example, the API gateway can act as a proxy to access, retrieve, and/or store data on behalf of a device running the web application 160.

Figure 3A:
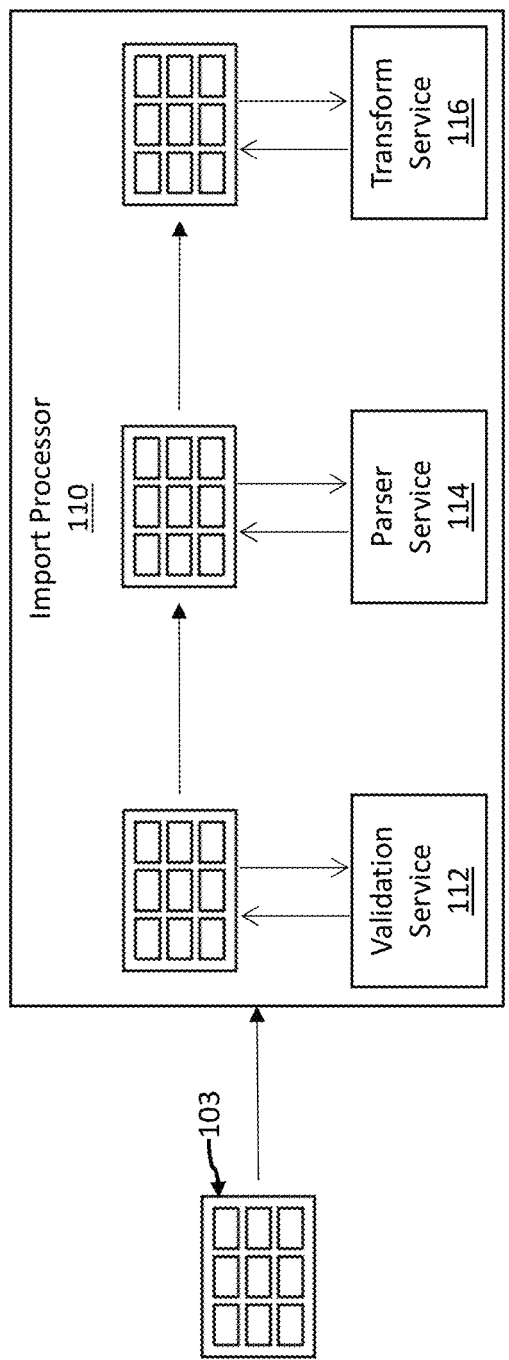

Referring to FIG. 3A, in some embodiments, the import processor 110 may include a series of services for converting the gaming data 103 to the structured PIMS format. For example, the import processor 110 may employ, e.g., a validation service 112 for the raw gaming data 103 received from the gaming engine 102. In some embodiments, the validation service 112 may receive the one or more files of the gaming data 103 and scan the gaming data 103 for errors and anomalies. For example, in some embodiments, the validation service 112 scans the gaming data 103 to ensure that the data has undergone data cleansing to ensure data quality (e.g., by removing empty records, removing invalid records, etc.), that is, that is the data are both correct and useful. In some embodiments, the validation service 112 may implement routines, such as, e.g., validation rules, validation constraints, check routines, among others and combinations thereof, that check for correctness, meaningfulness, and security of the gaming data 103. The rules may be implemented through the automated facilities of a data dictionary, or by the inclusion of explicit application program validation logic of the computer and its application.

In some embodiments, once validated for quality by the validation service 112, the gaming data 103 may be passed to a parser service 114 to parse the data. In some embodiments, the parser service 114 may be configured to process the gaming data 103 based on predetermined criteria, e.g., delimit markers. For example, where the gaming data 103 is comma delimited, the parser service 114 may extract from the gaming data 103 the data entries between each pair of commas to extract each transaction record represented therein. Similarly, the parser service 114 may be configured to parse the gaming data 103 according to any suitable delimiting scheme of the gaming data 103.

Moreover, in some embodiments, the parser service 114 may be configured to recognize and extract data attributes recorded in each record. For example, the gaming data 103 may order attributes in each transaction record according to a predefined order or arrangement. The parser service 114 may be configured to utilize that predefined order to extract each attribute from reach record. However, other suitable parsing schemes and techniques are also contemplated, including, e.g., natural language parsing, comma delimiting of each attribute and aggregating attributes for each transaction record according to order, among others and combinations thereof. Accordingly, the parser service 114 may identify and extract each transaction record in the gaming data 103 and the attributes thereof, such as, e.g., account type, account number, account holder name, transaction type, transaction amount, operation type, among other descriptors for transaction.

Continuing with FIG. 3A, in some embodiments, the parsed gaming data 103 may be provided to a transform service 116 for transformation into a structured format. For example, the transform service 116 can organize transaction data into ledger accounts as part of transform microservices such that each transform microservice can manage its own data repository to create a plurality of data repositories within the PIMS 100 system. In some embodiments, the transform service 116 uses the attributes and transaction records extracted by the parser service 114 to construct, e.g., a data object for each transaction record. For example, the transform service 116 may construct, e.g., SQL objects, JSON objects, or other database data objects to represent each transaction of the gaming data 103. Each data object may include defined fields for each of, e.g., account type, account number, account holder name, transaction type, transaction amount, operation type, among other descriptors for transaction to provide fully searchable transaction data objects.

Referring back to FIGS. 1-3A, in some embodiments, the internal design and organization of the PIMS 100 system can be based on a collection of modular, individual components, modules, and engines acting as microservices. The microservices can enable granularity to provide a narrow functional scope because they can be designed to implement a specific feature. The microservices can enable independent individual deployment that can be installed into a production environment without needing to install other microservices. The microservices can be loosely coupled such that changes to one microservice will minimally affect other microservices. The microservices can each maintain independent data repositories and provide access to the repository via an API or asynchronous messaging. The format of each data repository can vary. The microservices can maintain process isolation such that each microservice has its own process space and can be executed in isolation. The microservices can maintain an independent technology stack with its own set of technologies that can vary by each microservice. Each microservice can be structured around a single business capability and/or service. For example, the PIMS 100 architecture can define an extensible framework of specialized microservices that can be designed to fully harness the power of cloud computing. The PIMS 100 resources and services can be provisioned and released elastically in accordance with business needs and can fully leverage the scalability, reliability, and security of cloud computing and other distributed systems.

Figure 3B:
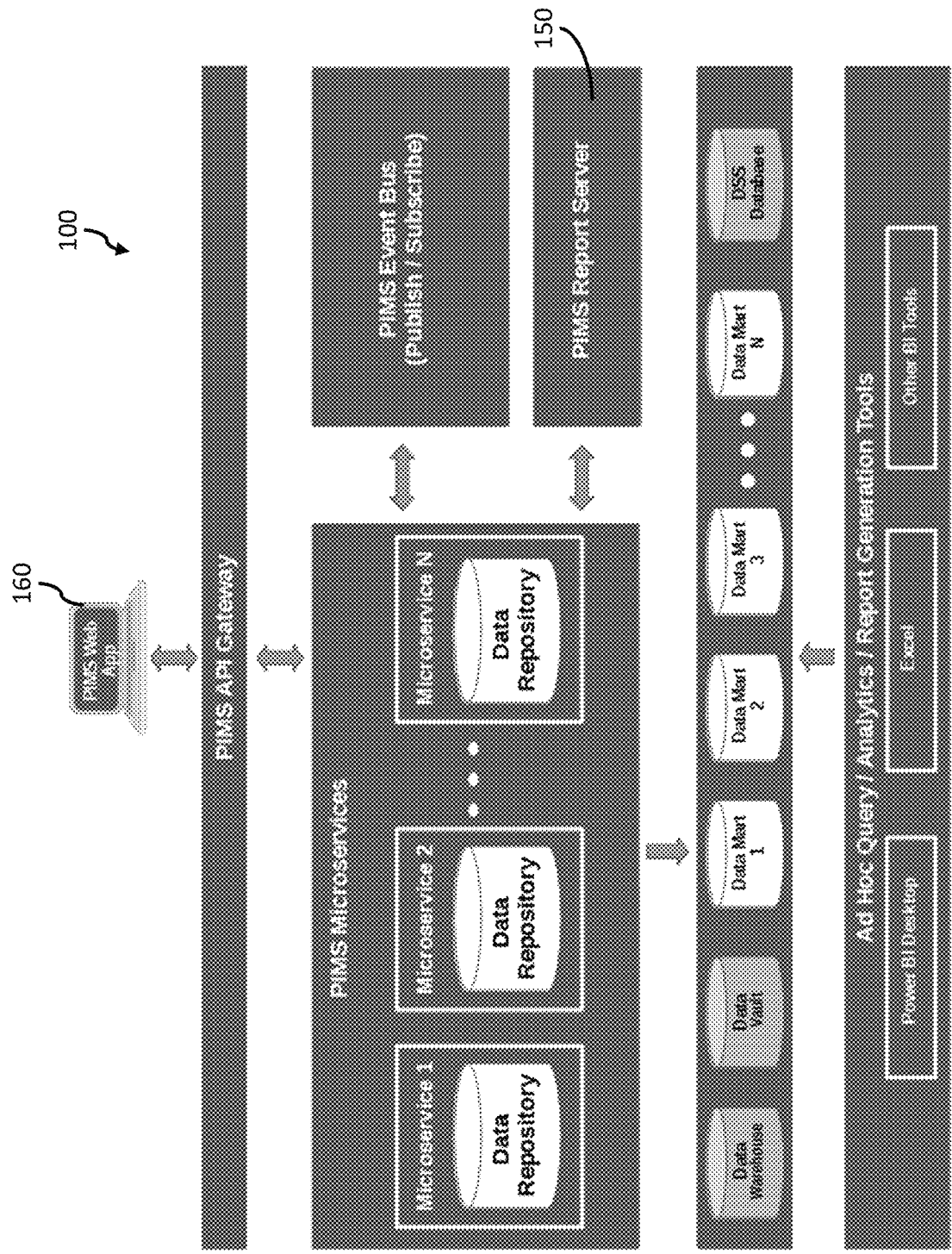

Referring to FIG. 3B, in some embodiments, PIMS 100 can provide the various microservices. In one example embodiment, the web application can be implemented and deployed using containers. Containers can be used to bundle an application and all the components it needs such as libraries, system tools, and other dependencies into one package. A containerized package can run reliably in a variety of computing environments. Containers run in isolation from one another but can also share the same operating system kernel. Containerized microservices have a number of benefits including platform independence so containerized microservices can run on a variety of hardware platforms including physical servers, virtual servers, and remote cloud servers. Containerized microservices can also run on a variety of operating systems including Microsoft Windows, Linux, and Mac. Containerized microservices can be created, started, and destroyed in a very short period of time and do not require a separate operating system. Hence, multiple containerized microservices can run on a single computing device (e.g., server). Microservices include functional microservices to support a single business capability and infrastructure microservices to support an internal system feature such as auditing, security, or logging.

In some embodiments, PIMS 100 can include microservices for a Download Scheduler, a demand download scheduler, a customer downloader, a transaction downloader, a comma-separated values (CSV) validator, a customer data validator, a transaction data validator, a customer transformer, a transaction transformer, a customer importer, a transaction importer, customer, transaction, data capture, and reporting, among others. In some embodiments, the download scheduler can automatically examine the download area at regular intervals to determine if there are any data files to import. If so, the download scheduler can place a download request corresponding to each import file, in the appropriate (customer or transaction) download queue of the event bus.

In some embodiments, the demand download scheduler, when initiated by the user, can examine the download area to determine if there are any data files to import. If so, the demand download scheduler can place a download request corresponding to each import file, in the appropriate (customer or transaction) download queue of the event bus. Customer Downloader can download customer data files once the request is placed in the customer download queue. Transaction Downloader can download transaction data files once the request is placed in the transaction download queue. CSV Validator can validate data file CSV headers.

In some embodiments, the customer Data Validator can validate customer data files. Data Validator can validate transaction data files. Customer Transformer can transform customer data into a format which is optimized for the data repository. Transaction Transformer can transform transaction data into a format which is optimized for the data repository. Customer Importer can import customer data files. Transaction Importer—imports transaction data files. The Customer Service can provide read-only access to customer data via an API. It queries the data repository and returns the results called view models. The Transaction Service can provide read-only access to transaction data via an API. It queries the data repository and returns view models. Data Capture can listen for "change data" messages on the event bus and stores the changes in a data repository. Reporting can provide reporting functionality.

Figure 3C:
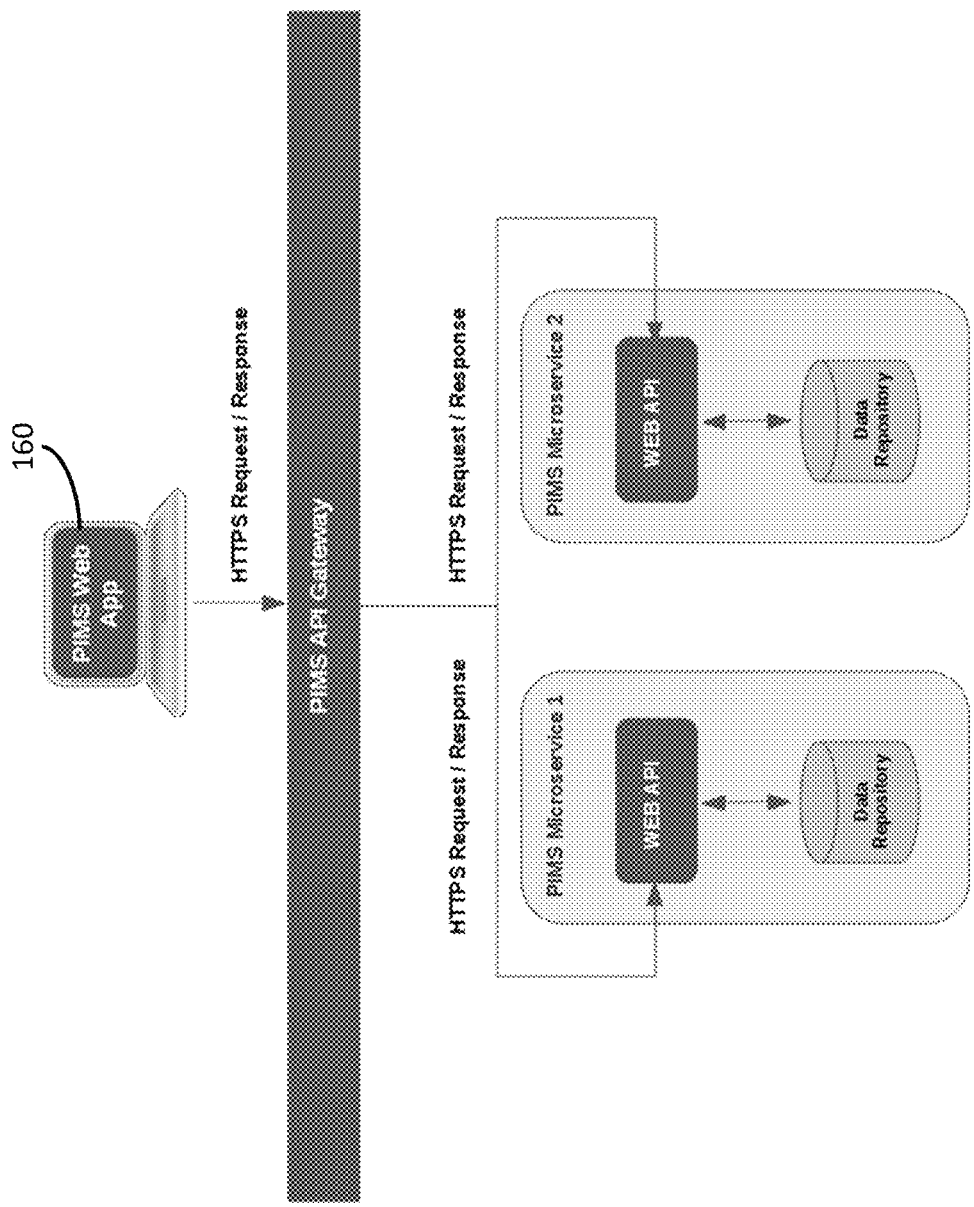

Referring to FIG. 3C, in some embodiments, the PIMS 100 microservices can be designed to communicate synchronously or asynchronously. Synchronous communication can be achieved via request/response APIs. One microservice can communicate with another microservice via a REST endpoint using HTTPS protocol. Asynchronous communication is achieved via the asynchronous publish/subscribe messaging model. This model can include a message-packet of data, a publisher—a microservice that sends messages, a subscriber—a microservice that receives messages, and an event Bus—an infrastructure component that receives messages from publishers and stores them until they can be consumed by subscribers. The event bus can be a message broker including multiple queues which are first-in-first-out data structures that hold messages. Publishers can asynchronously send messages to queues, and subscribers asynchronously read messages from queues. In some embodiments, PIMS microservices interact with the PIMS Event Bus via an API. The PIMS Event Bus implementation currently utilizes the Microsoft Azure Service Bus.

Figure 3D:
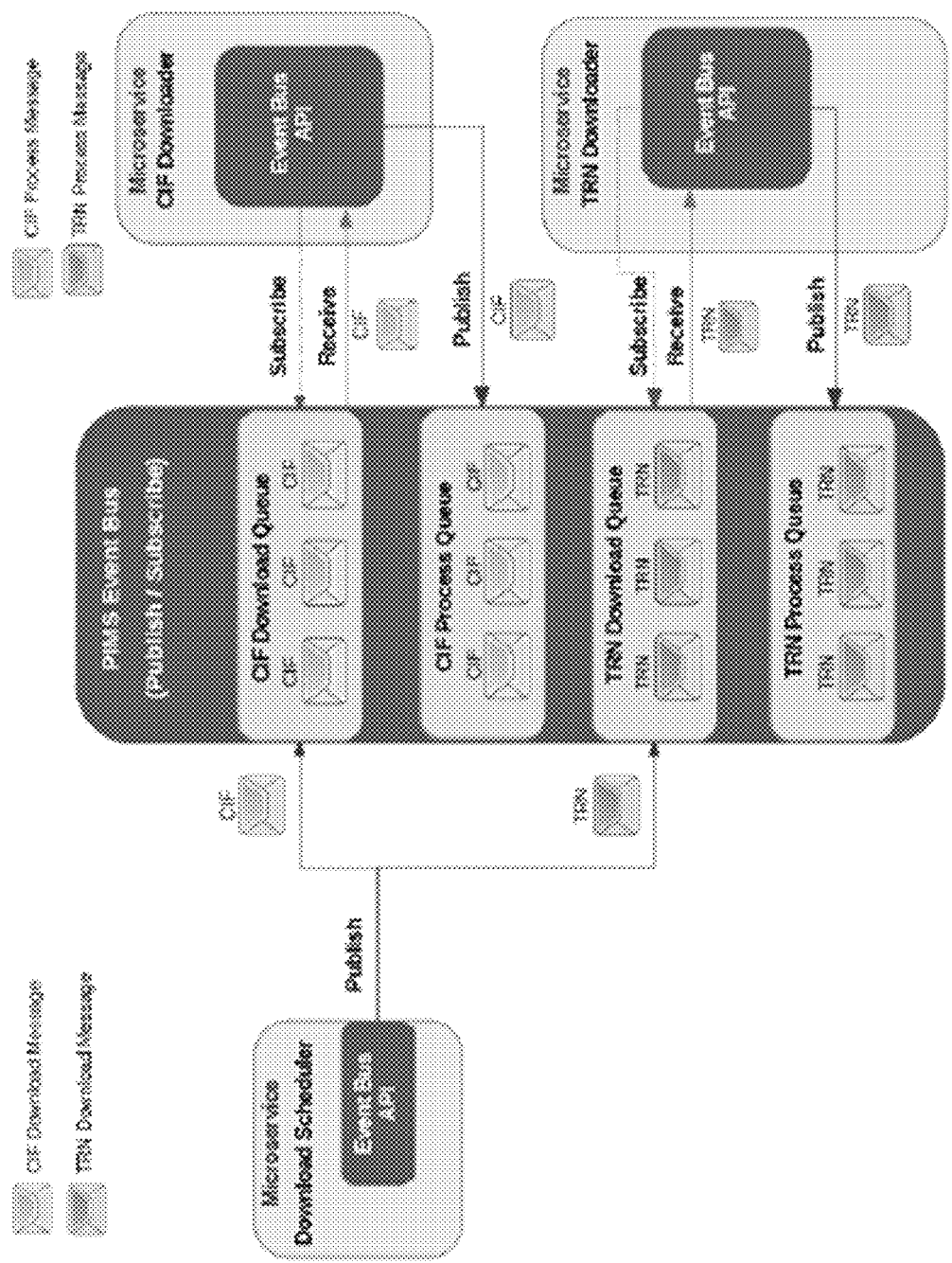

Referring to FIG. 3D, in some embodiments, PIMS 100 can include a PIMS API Gateway that can be a reverse proxy that routes client requests to the appropriate microservice. It can provide a single-entry point to access microservices. The PIMS API Gateway can also provide additional features such as authentication, caching and load balancing. The PIMS load balancer can distribute requests for microservices using one of round robin that loops through available microservices and sends requests and least connection that sends new requests to the microservice with the least number of existing requests.

Figure 3E:
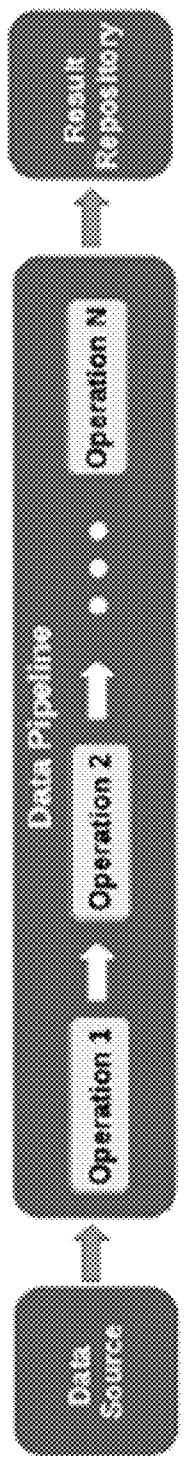

Referring to FIG. 3E, in some embodiments, PIMS 100 can include a data pipeline that defines a system for importing data from external data sources. The data pipeline can be a sequence of operations that extracts data from a source, transforms it (if necessary) in a manner which conforms with business logic rules, and stores the resultant data in a destination repository. The transformation step may involve the following operations validation, format revision, parsing, primary key identification, and aggregation. In some embodiments, the data pipeline can have two processing modes including batch processing and stream processing. In batch processing, data can be received and processed in large quantities at regularly scheduled intervals. In stream processing, data can be received and processed as soon as it is created, in a continuous fashion.

Figure 3F:
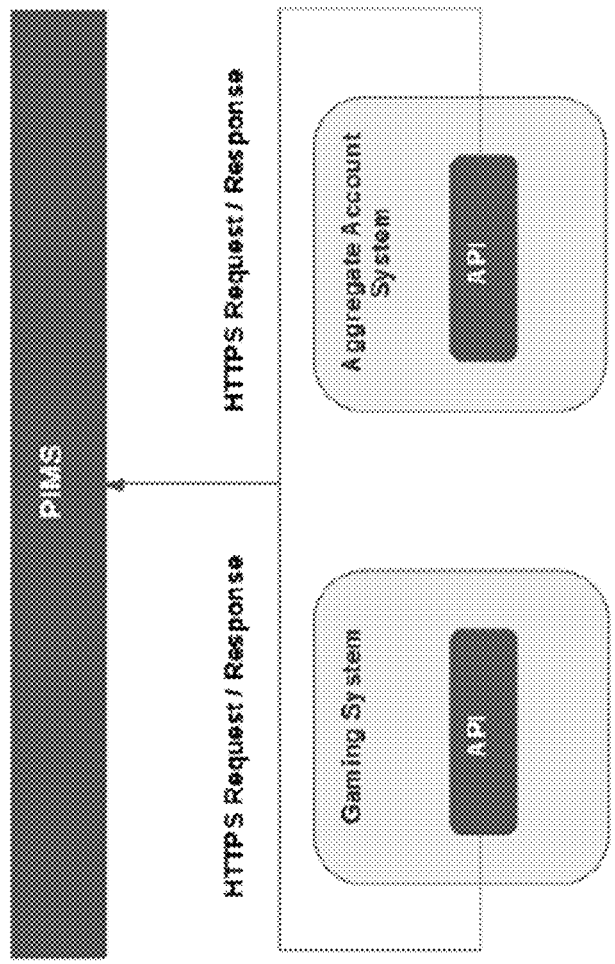

Referring to FIG. 3F, in some embodiments, where are two external sources that provide data to PIMS 100 via a gaming system and an aggregate account system 105. PIMS 100 can interact with these data sources via a provided API and implement a batch processing data pipeline to import CSV gaming data files. The PIMS 100 architecture can also be extended to include stream processing. Accordingly, the PIMS 100 may share daily transactional activity (e.g., deposits, withdrawals, etc.) with the aggregate account system Referring to FIG. 4A, in some embodiments, upon transformation by the transform service 116, the import processor 110 may produce the transaction data objects for storage in a production database 130. In some embodiments, the production database 130 may automatically receive the transaction data objects from the import processor 110 via, e.g., a data access service 120. In some embodiments, the data access service 120 may include, e.g., messaging services from automatically transferring the transaction data objects from the import processor 110 to the production database 130. For example, the data access service 120 may include, e.g., a publish-subscribed messaging service such that the production database 130 may be subscribed to transaction data object messages published by the import processor 110. However, other messaging protocols may be employed, such as, e.g., streaming protocols, message queuing protocols, application programming interface (API) push or pull requests, associative rendezvous, among others and combinations thereof.

In some embodiments, the production database 130 may store the transaction data objects for long-term storage of raw transaction data. In some embodiments, the production database 130 maintains the transaction data objects in an unprocessed form to maintain production database 130 efficiency and minimize storage resources. However, in some embodiments, the production database 130 may also maintain transaction reports produced by a report server 150.

Figure 4A:
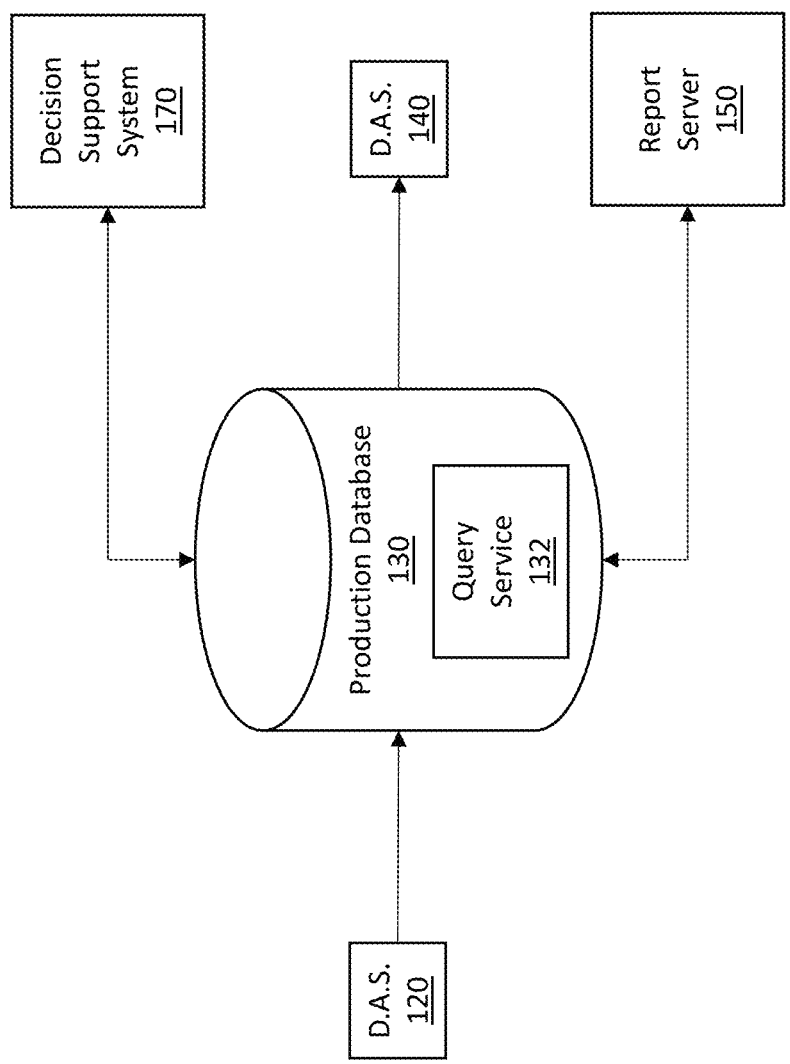
Figure 4B:
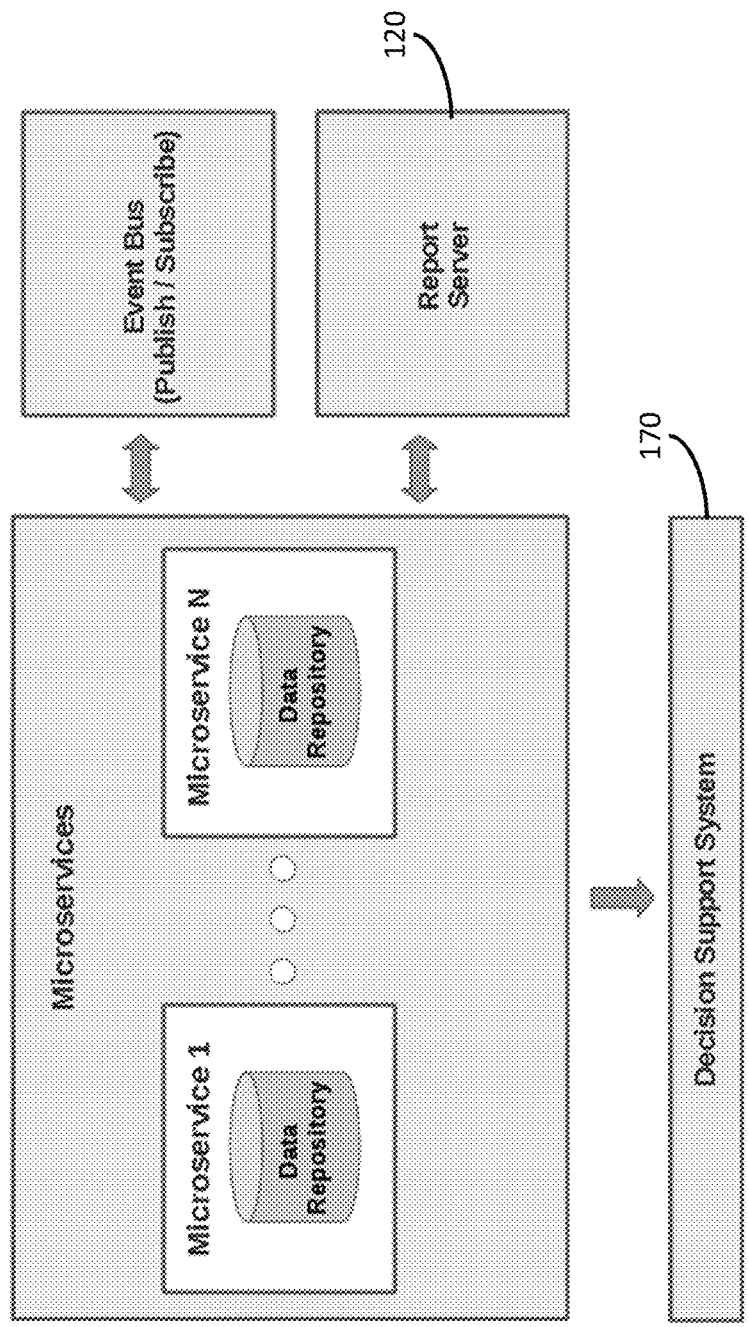

Referring to FIG. 4B, in some embodiments, upon transformation by the transform service 116, the import processor 110 may produce the transaction data objects for storage in microservice data repositories. In some embodiments, microservice data repositories may automatically receive the transaction data objects via import processor microservices. In some embodiments, messaging services can be used when transferring transaction data objects via import processor microservices to data repositories. For example, a data transfer microservice may publish a message pertaining to completion status to which other microservices have subscribed. However, other messaging protocols may be employed, such as, e.g., streaming protocols, message queuing protocols, application programming interface (API) push or pull requests, associative rendezvous, among others and combinations thereof. In some embodiments, microservice data repositories may store the transaction data objects for long-term purposes.

Figure 5A:
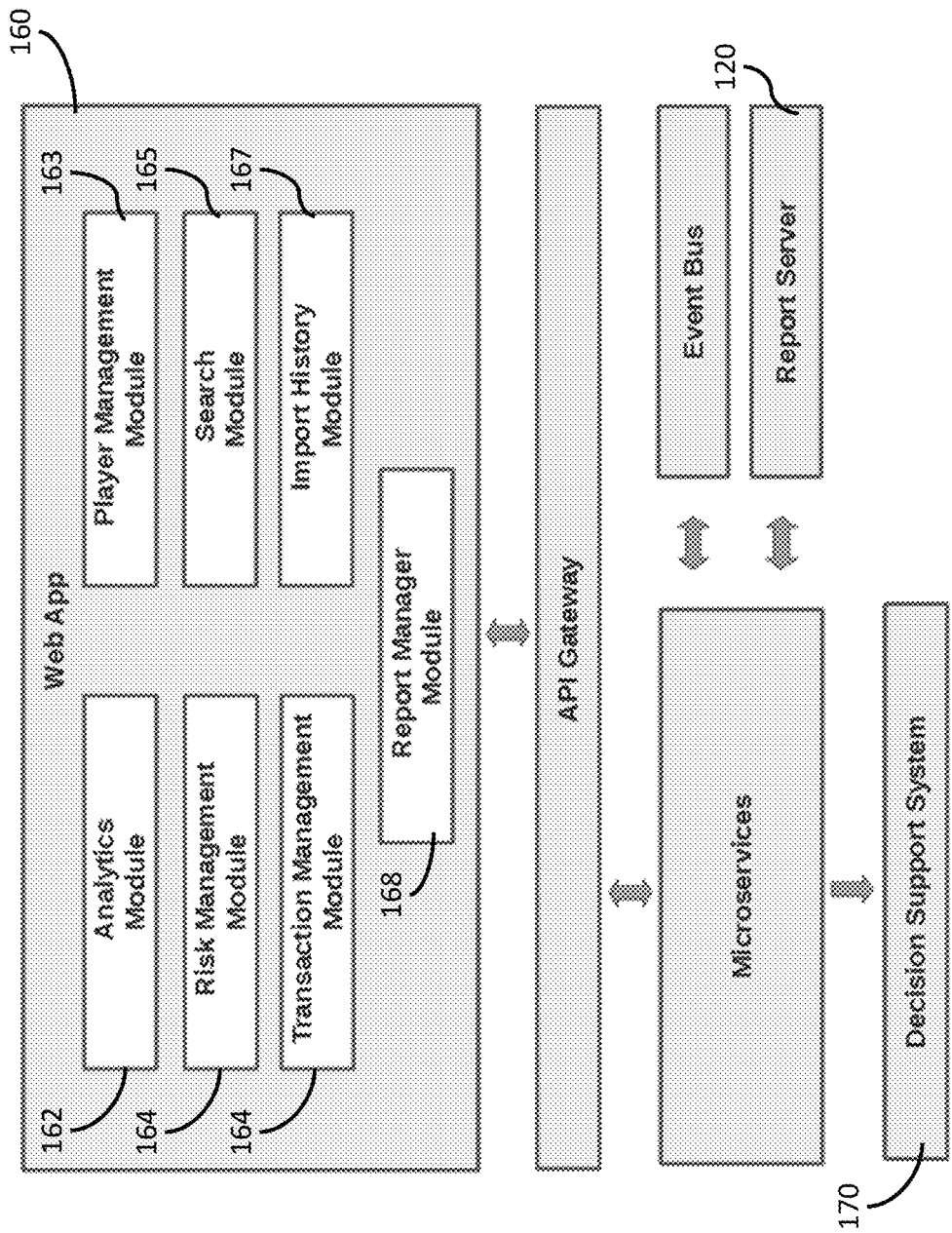
Figure 6A:
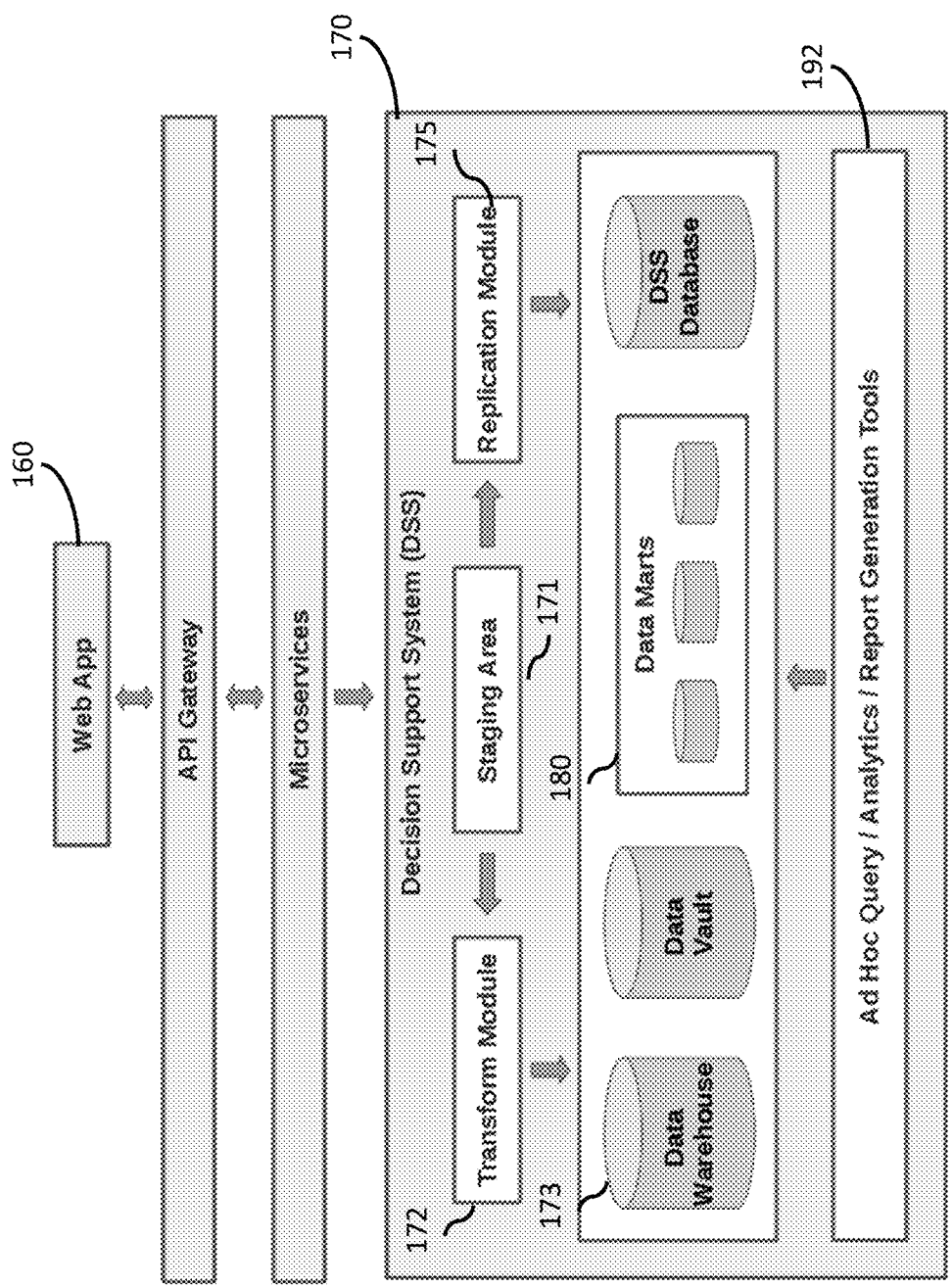

Referring to FIGS. 5A and 6A, in some embodiments, microservices may make the transaction data objects accessible to a web application 160, the-report server 150 and a decision support system 170 for processing and visualization of the transaction data objects. The microservices may query various data repositories for selections of transaction data objects associated with particular transaction records of the gaming data 103 in order to perform processes, such as, e.g., statistical analysis, business report generation, transaction management, transaction history discovery, transactions search, risk management, analytics, player management, deposit and withdrawal analytics, among other analyses and data management processes. In some embodiments, the report server 150 and decision support system 170 may provide reports for, e.g., total transaction amount grouped by transaction type, total transaction count grouped by transaction type, total transaction amount for a specific player grouped by transaction type, total transaction count for a specific player grouped by transaction type, among other reports or any combination thereof. In some embodiments, the microservices may query various data repositories. For example, microservices may employ a database querying service utilizing query languages such as, e.g., a Structured Query Language (SQL), QL, 4D Query Language (4D QL), Datalog, HTSQL, IBM Business System 12 (IBM BS12), ISBL, jOOQ, Java Persistence Query Language (JPQL), JavaScript and/or MongoDB, LINQ, Object Query Language (OQL), Query By Example (QBE), Quel, Tutorial D, XQuery, or other suitable query languages and combinations thereof. In some embodiments, microservices may be employed for data access. For example, the web application 160 may interface with the API Gateway for generating requests for data.

In some embodiments, a data access service 140 may be employed. For example, the web application 160 may interface with the production database 130 to query the production database 130 via a web API 161 for generating requests for the data access service 140. Similar to the data access service 120, the data access service 140 may include, e.g., messaging services for automatically or on demand transferring the transaction data objects from the production database 130 to the data access service 140 for access by the web application 160 at a user device via the web API 161. For example, the data access service 140 employ, e.g., an API for generating requests to the query service 132 based on web application 160 commands selected by a user.

In some embodiments, the web application 160 may provide a user with modules for generating the commands and returning transaction data objects from the microservice data repositories for processing and analysis according to the functions of each module selected by the user. In some embodiments, the modules of the web application 160 may provide a user with functionality for player information management at the per-player level, thus providing insight and accounting into individual ledger accounts at the player level, or at an aggregate level across a gaming platform.

In some embodiments, the web application 160 can include, e.g., an analytics module 162 for performing, e.g., business or other data analytics regarding transaction trends across the gaming platform as well as for each individual player. The web application 160 may also include a player management module 163 for managing, e.g., the player ledger accounts accounting for each player a ledger of transactions associated with each player. In some embodiments, the web application 160 may include a risk management module 164 for identifying and surfacing risk-related issues for players and transactions based on, e.g., the analytics of the analytics module 162 and/or the ledger account data of the player management modules 163. In some embodiments, a transaction management module 166 may also be included for managing transaction-related data based on the transaction data objects. In some embodiments, the risk management module 164 may also incorporate the transaction management data form the transaction management module 164 to assess and manage risk. In some embodiments, the web application 160 may also provide for the functionality to search for individual players and/or transactions according to, e.g., date, transaction type, player account, ledger account, transaction amount, operation, among other attributes. Moreover, an import history module 167 of the web application 160 may provide for viewing and managing gaming data 103 import histories to produce a log of batches of gaming data 103 provided by the gaming engine 102.

In some embodiments, the web application 160 of the PIMS 100 may employ reconciliation functions to reconcile transactions at the ledger level, e.g., at the individual transaction/player level. In some embodiments, the reconciliation functions may include, e.g., the player management module 163, the transaction management module 166, and/or the analytics module 162 to ensure that two sets of records of transactions are in agreement, e.g., by comparing transaction data objects from the gaming data 103 with player account balances in the aggregate account system 105. Reconciliation can be used to ensure that the money leaving an account matches the actual money spent. This can be done by making sure the balances match at the end of a particular accounting period. Accordingly, the transaction management module 166 may employ the transaction type, operation type, and transaction amount descriptors of the transaction data objects to reconcile each transaction.

The web application may also employ a risk module 164 for transaction reconciliation. In some embodiments, the PIMS 100 may receive gaming data 103 from the gaming engine 102, either periodically (e.g., daily) or continuously. As described above, the gaming data 103 may include deposits and withdrawals of each gaming account via the gaming engine 102. In some embodiments, the PIMS 100 receives this data and balances the gaming wallet with each player's account at the aggregate account system 105. Accordingly, the risk module 164 may reconcile the gaming side with the ledger side to balance accounts. In some embodiments, the risk module 164 may verify that the balance totals in the gaming data 103 is equal to the transactional detail totals, and then perform a comparative analysis of the aggregate account system 105 accounts.

In some embodiments, the risk module 164 may identify irreconcilable transactions due to high risk behaviors, such as, e.g., transfers to a different bank account that normal, a same credit card funding multiple player accounts, a player account being funded by multiple credit cards, a player account being funded by credit cards or accounts from multiple locations, etc. Thus, the risk management module 164 may match the behaviors to known types of risky behavior, such as behavior correlated to money laundering, fraud, credit risk, or other types of risk. As such, the risk management module 164 may compare each transaction to a library of risk specifications. Each risk specification may define a risk type and conditions associated with the risk type, such as, e.g., a monetary threshold, an operation type, location conditions, among other. For example, the risk management module 164 may compare a transaction volume for a given wallet with the monthly balance of the wallet to assess a risk level.

In some embodiments, some examples of high risk behaviors may include, e.g., where a player establishes a player account and funds the player account but does not initiate any play and instead pulls the funds immediately out, e.g., via an ATM. Such behavior may be a sign of money laundering and PIMS 100 may autogenerate an email to a designated compliance officer to review this potential risk event. In some embodiments, the risk module 164 may identify other possible high risk behaviors such as, e.g., identify transaction amounts greater than or equal to $5,000, identify transaction amounts greater than or equal to $10,000 grouped by player for each day, identify player accounts with incomplete social security numbers, identify player accounts with duplicate social security numbers, identify player accounts with a non-zero overdrawn balance, identify player accounts where the OFAC results are "not verified" or "external verification failed" and non-zero balance amounts, identify player accounts where the OFAC results are "not verified" or "external verification failed", among others or any combination thereof.

Other factors that the risk management module 164 may take into account in determining risk level of a given ledger account or transaction may include, e.g., account age, loads (e.g., deposits) count and/or dollar volume including the ability to aggregate by unique player identification (ID) or social security number (SSN) within various time periods, wagers count and/or dollar volume including the ability to aggregate by Player ID or SSN within various time periods, offloads (e.g., withdrawals) count and/or dollar volume including the ability to aggregate by Player ID or SSN within various time periods, ratio of loads to wagers including the ability to aggregate by Player ID or SSN within various time periods, ratio of offloads to wagers including the ability to aggregate by Player ID or SSN within various time periods, ratio of offloads to net winning (e.g., winnings less wagers) including the ability to aggregate by Player ID or SSN within various time periods, ratio of offloads to loads at certain ratio of loads to wagers including the ability to aggregate by Player ID or SSN within various time periods, among other factors and combinations thereof.

Accordingly, in some embodiments, the risk management module 164, transaction management module 166, player management module 163 among other reconciliation-related modules may automatically detect irreconcilable transactions in the ingested gaming data 103 and, e.g., set a flag or other indicator indicating a risk type associated with a wallet and/or transaction. In some embodiments, the flag may be used to generate alerts and/or reports by a report manager 168 to notify the operator of risks. In some embodiments, the reconciliation may be performed periodically, e.g., daily, to provide an operator with a reports at an operator computing device indicating the accounts and transactions that indicate risk. The reconciliation may also be performed in response to different trigger events, for example, a new player and/or ledger account being opened, a certain allocation of funds is deposited or withdrawn, etc.

In some embodiments, the PIMS 100 may also employ compliance management functionalities using one or more compliance management services to ensure that the operator and the players interacting with the gaming engine 102 comply with external and internal regulations, such as, e.g., anti-money laundering (AML) or bank secrecy act (BSA) law, Regulation E, and fraud regulations. For example, to grant insurance to a given player account, the FDIC may require the given player to conform to federal laws and regulations such as, e.g., Financial Institution Letters (FILS). For example, the player must provide, e.g., an identification, such as a name and/or social security number. Other factors for determining compliance of the gaming platform, a given ledger account or transaction may include, e.g., account age, loads (e.g., deposits) count and/or dollar volume including the ability to aggregate by player identification (ID) or social security number (SSN) within various time periods, wagers count and/or dollar volume including the ability to aggregate by Player ID or SSN within various time periods, offloads (e.g., withdrawals) count and/or dollar volume including the ability to aggregate by Player ID or SSN within various time periods, ratio of loads to wagers including the ability to aggregate by Player ID or SSN within various time periods, ratio of offloads to wagers including the ability to aggregate by Player ID or SSN within various time periods, ratio of offloads to net winning (e.g., winnings less wagers) including the ability to aggregate by Player ID or SSN within various time periods, ratio of offloads to loads at certain ratio of loads to wagers including the ability to aggregate by Player ID or SSN within various time periods, among other factors and combinations thereof.

In some embodiments, where the compliance management services identify non-compliance, an alert (e.g., email, text message, automated voice message, push notification, etc.) may be generated for a predetermined compliance officer. The alert may include non-compliance data, such as, e.g., account identifiers and details of the non-compliant interactions (e.g., date, time, transaction, transaction amount, etc.). As a result, the predetermined compliance officer may investigate the interaction, which may result in action with the customer and the closing of an account if not remedied Continuing with FIG. 5A, similar to the reconciliation process, where compliance checks performed may be performed by risk management module 164, transaction management module 166, player management module 163 among other reconciliation-related modules to identify non-compliant transactions and/or accounts, a flag may be set on the transactions and/or accounts. Accordingly, the flag may be used to generate alerts, e.g., at the operator computing device to notify the operator of any non-compliances, e.g., with a compliance report or other compliance visualization. In some embodiments, the compliance assessment may be performed periodically, e.g., daily, to provide an operator with a visualization at the operator computing device indicating the compliance report. The compliance assessment may also be performed in response to different trigger events, for example, a new account being opened, a certain allocation of funds is deposited or withdrawn, etc.

In some embodiments, the web application 160 of the PIMS 100 may also employ the analytics module 162 to provide operators with analytics on both the operator level and the player level. Leveraging the structured ingested gaming data 103, the analytics module 162 may search and filter deposit and transaction data across many metrics to generate an operator deposit dashboard, a player deposit dashboard, among other deposit dashboards representing patterns and trends through time across the gaming engine 102.

Figure 5B:
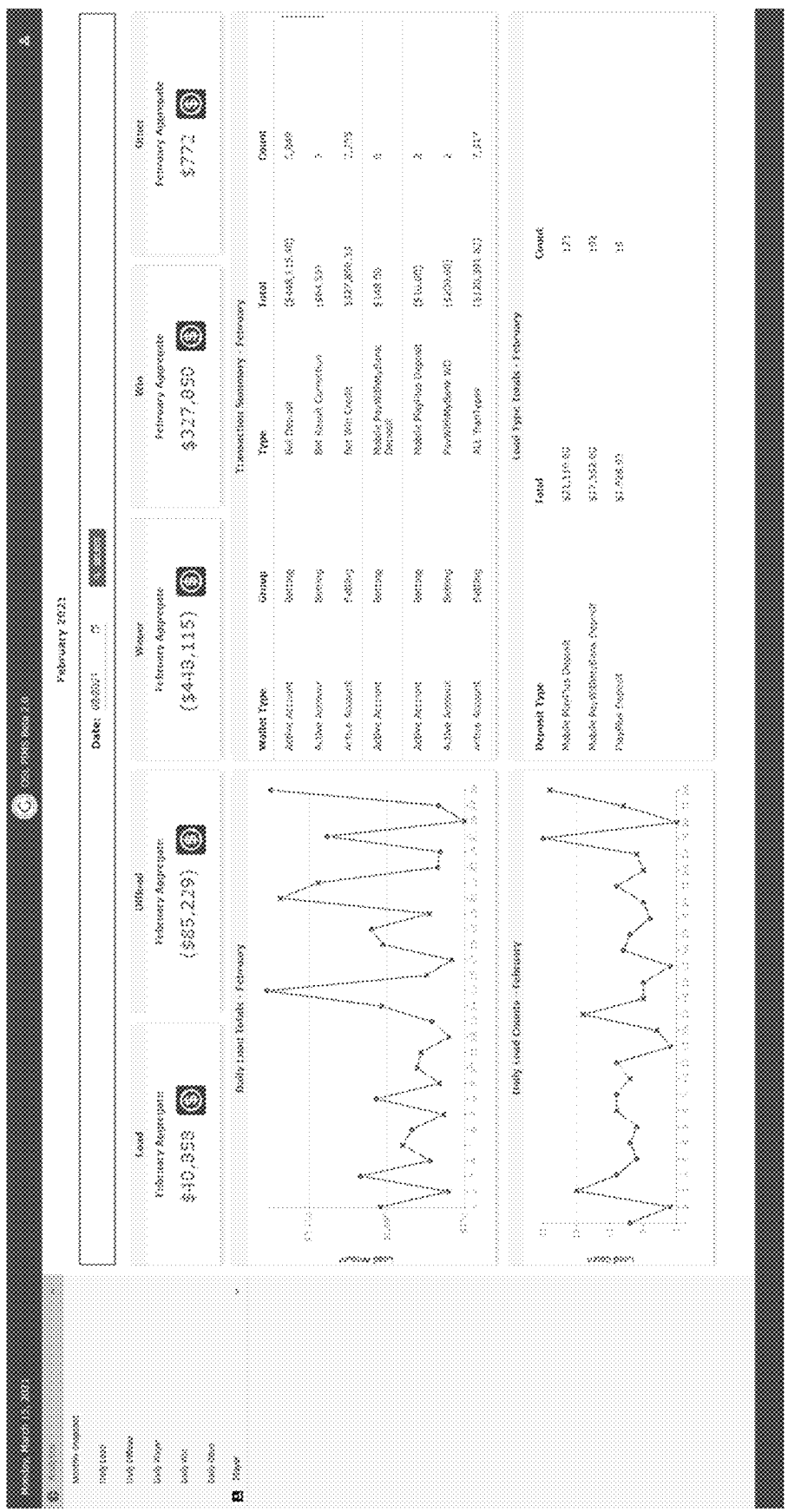

In some embodiments, the analytics module 162 may generate an operator deposit dashboard, displayable at the operator computing device. In some embodiments, the operator deposit dashboard can include, e.g., deposit key performance indicators, deposit monthly snapshots, deposit month-to-date forecasts, among other performance and pattern analytics. FIG. 5B illustrates an example dashboard output by the analytics module 162 including transaction amounts, transaction counts, transaction amounts and count totals grouped by transaction type and by month, etc. FIG. 5C illustrates an example of an operator deposit report that tabulates and calculates various key performance indicators, forecasts, projections and balances.

In some embodiments, the deposit key performance indicators can include daily totals, month-to-date totals, year-to-date totals, lifetime totals, amongst other operator level deposit totals. In some embodiments, the deposit key performance indicators can include, e.g., visualizations such as graphs, charts, tables, and other graphics depicting the totals and totals through time.

In some embodiments, the deposit monthly snapshots can include graphs for a current year of each of, e.g., monthly deposit totals, monthly deposit averages, monthly deposit counts (e.g., a number of deposits), monthly deposit maximums indicating the maximum deposit made each month, among other monthly data.

In some embodiments, the deposit month-to-date forecast can include projections for deposits for, e.g., a remainder of the month. For example, the analytics module 162 may determine for the operator of the gaming engine 102 a forecasted total deposit amount for the remainder of a month based on deposits during the month-to-date. For example, the forecasted deposit amount may be calculated, e.g., according to the equation(Forecast Amount)=(MTD/Current Day)×(Number of Days Remaining in Month), where MTD is the month-to-date. Similarly, the month-to-date forecast can include a monthly deposit forecast estimation estimating a total deposit amount of a month based on the month-to-date deposit amount and the forecasted amount for the remainder of the month. For example, the monthly deposit forecast can be determined, e.g., using the equation (Monthly Deposit Forecast)=(Monthly Deposite)×(Forecast Amount). In some embodiments, the operator deposit dashboard can include a graph comparing the monthly actual deposit versus the monthly deposit forecast.

Figure 5D:

In some embodiments, the analytics module 162 may generate a player deposit dashboard, displayable at the operator computing device. In some embodiments, the player deposit dashboard can include, e.g., deposit key performance indicators, deposit monthly snapshots, among other performance and pattern analytics, etc. FIG. 5D illustrates an example of a player deposit dashboard, including wager totals and counts, transaction dates and counts, among other information.

In some embodiments, the deposit key performance indicators can include daily totals, month-to-date totals, year-to-date totals, lifetime totals, amongst other player level deposit totals. In some embodiments, the deposit key performance indicators can include, e.g., visualizations such as graphs, charts, tables, and other graphics depicting the totals and totals through time.

In some embodiments, the deposit monthly snapshots can include graphs for a given player for a current year of each of, e.g., monthly deposit totals, monthly deposit averages, monthly deposit counts (e.g., a number of deposits), monthly deposit maximums indicating the maximum deposit made each month, among other monthly data on the player level.

In some embodiments, the operator deposit dashboard and the player deposit dashboard may be selectively displayed at the operator computing device and/or the player computing device 101. As a result, the operator may track deposit performance on both the operator and the player level. Similarly, the player may track his or her own deposit performance via the player computing device 101. Accordingly, the player computing device 101 and the operator computing device may be configured with the player management web application 160 to view the various dashboards, warnings, summaries and other visualizations produced by the PIMS 100, e.g., such as those described above.

In some embodiments, the analytics, risk and compliance results, as provided by the analytics module 162, the risk management module 164, can be compiled into reports by the report management 168. Thus, risk determinations, risk flags, compliance issue flags, and analytics can be saved and stored by the report manager 168 in the report server 150. In some embodiments, the report server 150 may communicate, for example via microservices, with the web application 160 to organize and serve the results of the various analytics operations for, e.g., risk, compliance and business/performance analytics as described above. In some embodiments, the report server 150 may store and retrieve the reports. In some embodiments, a specific module can be used for performing the compliance tasks. The stored reports may then be served to the web application 160 at a user computing device on demand upon user selection with the report management module 168. However, in some embodiments, the report server 150 may store the reports locally within the report server 150 itself.

Thus, in operation, a player at a player computing device 101 may participate in gaming via the gaming system 101 of a gaming operator. Such participation may include transaction, e.g., bets, balance deposits, and other transaction using a wallet associated with player. Gaming data 103 pertaining to the transactions may be produced by the gaming system 101 including, e.g., a ledge of transaction recorded in a flat text file. In some embodiments, the PIMS 100 receives the text file of gaming data 103 and ingests it with the import processor 110 to structure the data of the transaction. Using, e.g., the player management module 163, the risk management module 164 and/or the transaction management module 166 of the web application 160, the transaction may then be reconciled with accounts in the aggregate account system 105, analyzed for indications of risk, such as activities indicating fraud, money laundering, credit risks, among other, and analyzed to assess compliance of the transaction data with internal and external regulation of transactions. The analytics module 162 also analyzes the transaction data to produce deposit analytics, such monthly and yearly trends for deposits among others.

The results from each module of the PIMS 100, as well as the transaction data, may be provided to an operator and/or bank, such as via a suitable graphical user interface at the operator computing device, to display the results. Additionally, a user at the operator computing device may also search the transaction data across many degrees of freedom using the search module 165, including, e.g., player name or ID, wallet ID, wallet type, transaction type, transaction quantity, transaction operation, date, social security number, among others and combinations thereof.

Referring to FIG. 6A, in some embodiments, the decision support system 170 may also communicate with the web application 160 and, for example, via microservices, to support advanced and real-time decision making (e.g., volume growth or retraction, user-base growth or retraction, transaction frequency changes, etc.) based on transaction and ledger account analyses. In some embodiments, the decision support system 170 ingests via microservices transaction data objects and associated analytics and reports for providing organized data (e.g., data marts 180) for use with ad-hoc report generation in real-time.

In some embodiments, microservices may implement an extract-transform-load (ETL) paradigm to populate data repositories within the decision support system 170. Thus, the ingested data is staged with a data staging module 171 to, e.g., make the data available to the transform module 172 for data transformation operations. In some embodiments, the transform module 172 may consolidate and align data from the reports and from the transaction data objects, as well as other data staging operations such as, e.g., contention minimization, independent scheduling for multiple targets, change detection, data cleansing, aggregate recalculation, data archiving, among others.

Figure 6B:
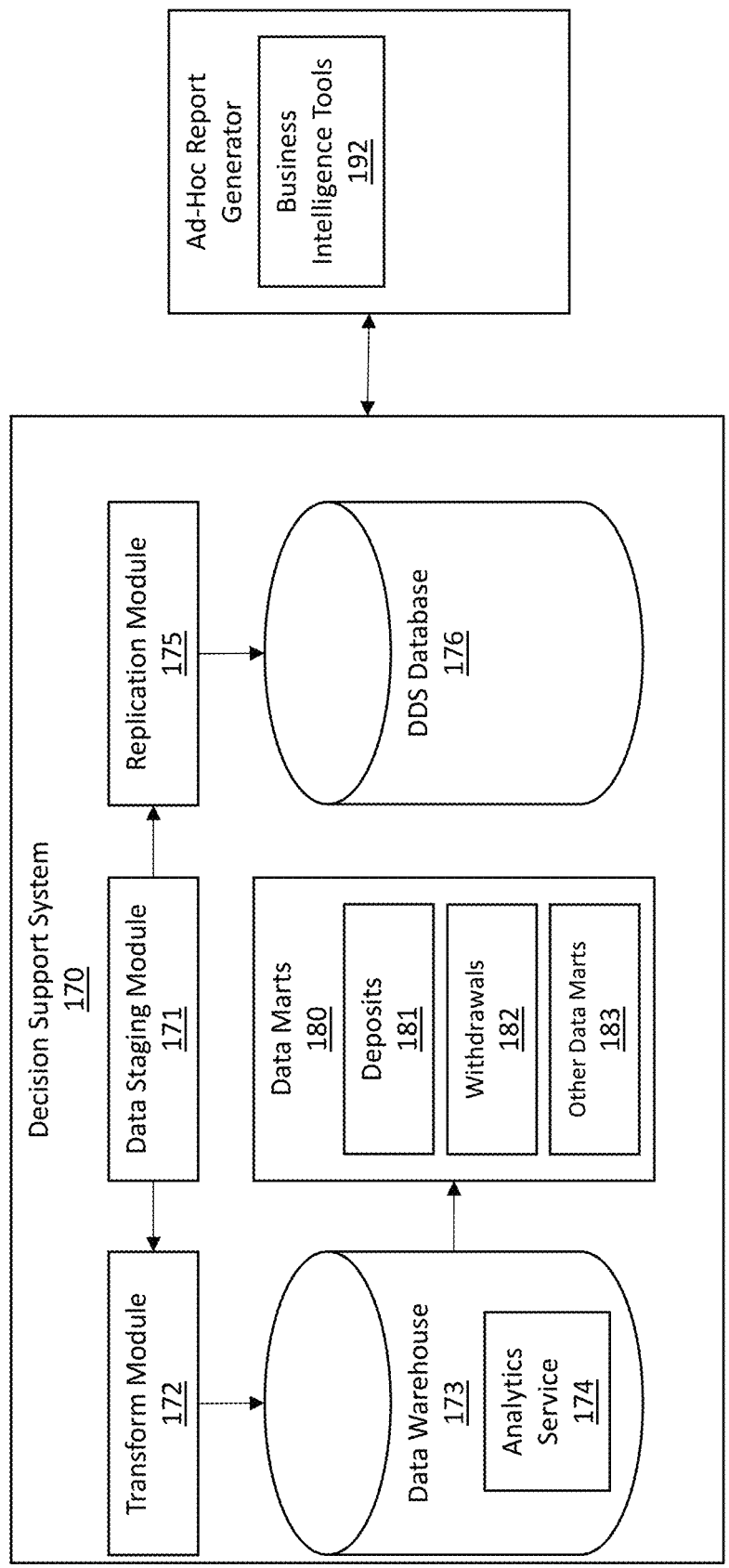

Referring to FIGS. 6A and 6B, in some embodiments, the transformed data may be provided to a data warehouse 173 for storage of the transformed data. In some embodiments, the data warehouse 173 can interface with an analytics service 174 for organizing and processing the data to generate the data marts 180. In some embodiments, The data marts 180 include a structure or access pattern specific retrieval of data in the data warehouse 173. In some embodiments, the data marts 180 are a subset of the data warehouse 173 and may be configured for specific business analytics, reports, or other domain specific data retrieval. Accordingly, the analytics service 174 may populate the data marts 180 based on the reports and transaction data objects to enable to isolate the use, manipulation and development of various subsets of the data. Therefore, the analytics service 174 may populate the data marts 180 for more readily accessible data without requiring complicated or resource heavy queries.

In some embodiments, the data marts 180 can include, e.g., a deposits data mart 181, a withdrawals data mart 182, among other data marts 183. Thus, the analytics service 174 may identify and extract, e.g., each transaction associated with a deposit for the deposits data mart 181, such as, e.g., loads to a player account or player wallet in the gaming engine 102 with the electronic payment system 104, transfers from other accounts, among others. Similarly, the analytics service 174 may identify and extract, e.g., each transaction associated with a withdrawal for the withdrawals data mart 182.

Continuing with FIGS. 6A and 6B, in some embodiments, the data marts 180 may be accessible by an ad-hoc report generator 190. Situations may arise where the report server 150 does not have a readily available report. To improve the efficiency of generating an ad-hoc report, the ad-hoc report generator 190 may interface with the data marts 180 to quickly and efficiently obtain deposits from the deposits data mart 181 or withdrawals from the withdrawals data mart 182 or other data marts 183, and combinations thereof, for use by business intelligence tools 192 to generate business reports assess the gaming platform and gaming engine 102. In some embodiments, to protect against loss of data, the staged data at the stat staging module 171 may be replicated by a replication module 175 for long-term back-up storage in a data distribution service (DDS) database 176. In some embodiments, the DDS database 176 may also be employed by the ad-hoc report generator 190 to combine the data from the data marts 180 with, e.g., other reports, transaction data objects, and other data.

Figure 7:
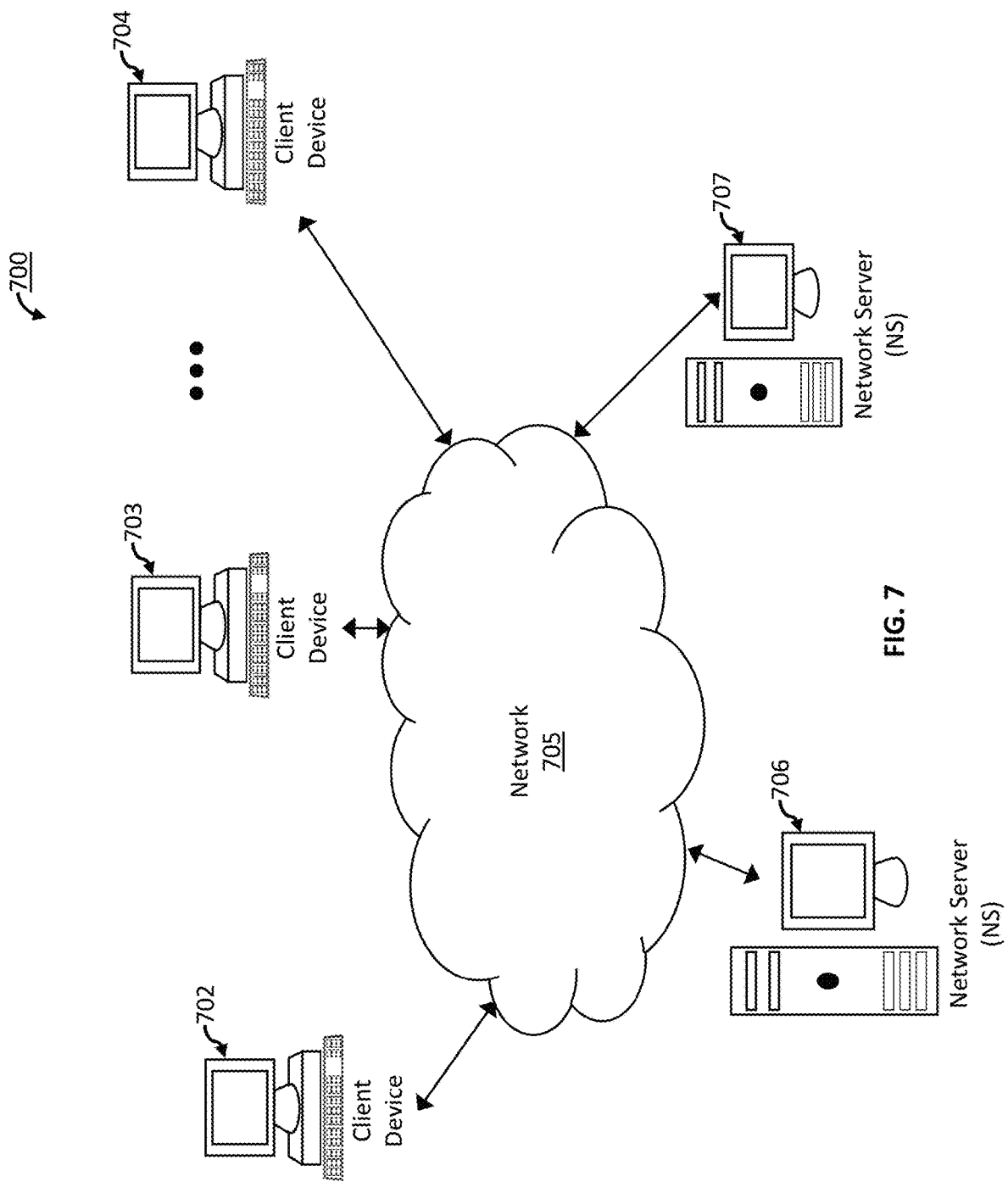

FIG. 7 depicts a block diagram of an exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 700 may be configured to manage a large number of members and concurrent transactions, as detailed herein. In some embodiments, the exemplary computer-based system and platform 700 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 7, members 702-404 (e.g., clients) of the exemplary computer-based system and platform 700 may include virtually any computing device capable of receiving and sending a message over a network (e.g., cloud network), such as network 705, to and from another computing device, such as servers 706 and 707, each other, and the like. In some embodiments, the member devices 702-404 may be personal computers, multiprocessor systems, microprocessor-based or programmable consumer electronics, network PCs, and the like. In some embodiments, one or more member devices within member devices 702-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-404 may include may run one or more applications, such as Internet browsers, mobile applications, voice calls, video games, videoconferencing, and email, among others. In some embodiments, one or more member devices within member devices 702-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-404 may be specifically programmed by either Java, .Net, QT, C, C++ and/or other suitable programming language. In some embodiments, one or more member devices within member devices 702-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer or machine readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 7, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-404.

In some embodiments and, optionally, in combination of any embodiment described above or below, for example, one or more exemplary computing member devices 702-404, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 8:
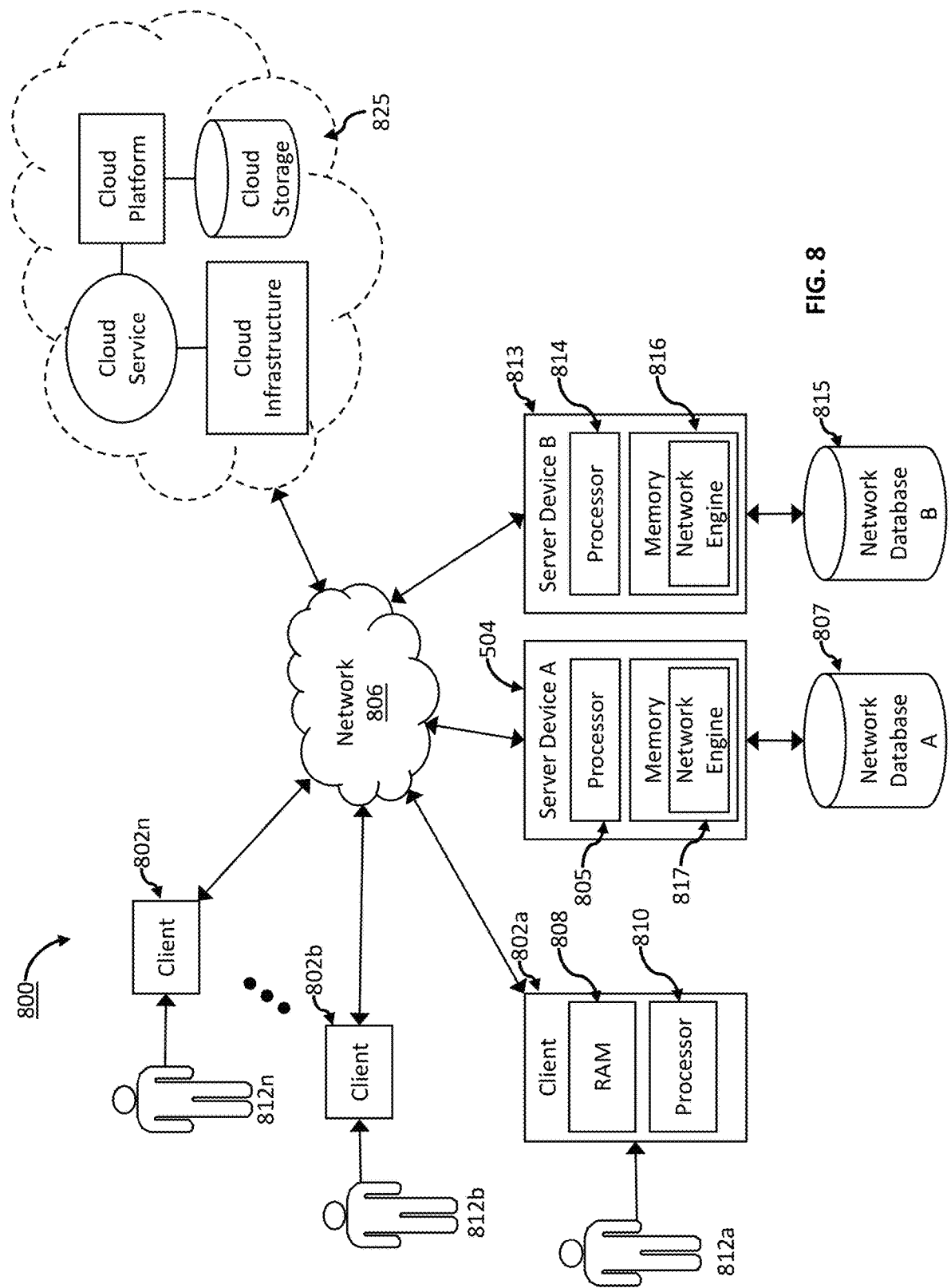

FIG. 8 depicts a block diagram of another exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b thru 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 802n, may communicate over the exemplary network 806 with each other and/or with other systems and/or devices coupled to the network 806. As shown in FIG. 8, exemplary server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
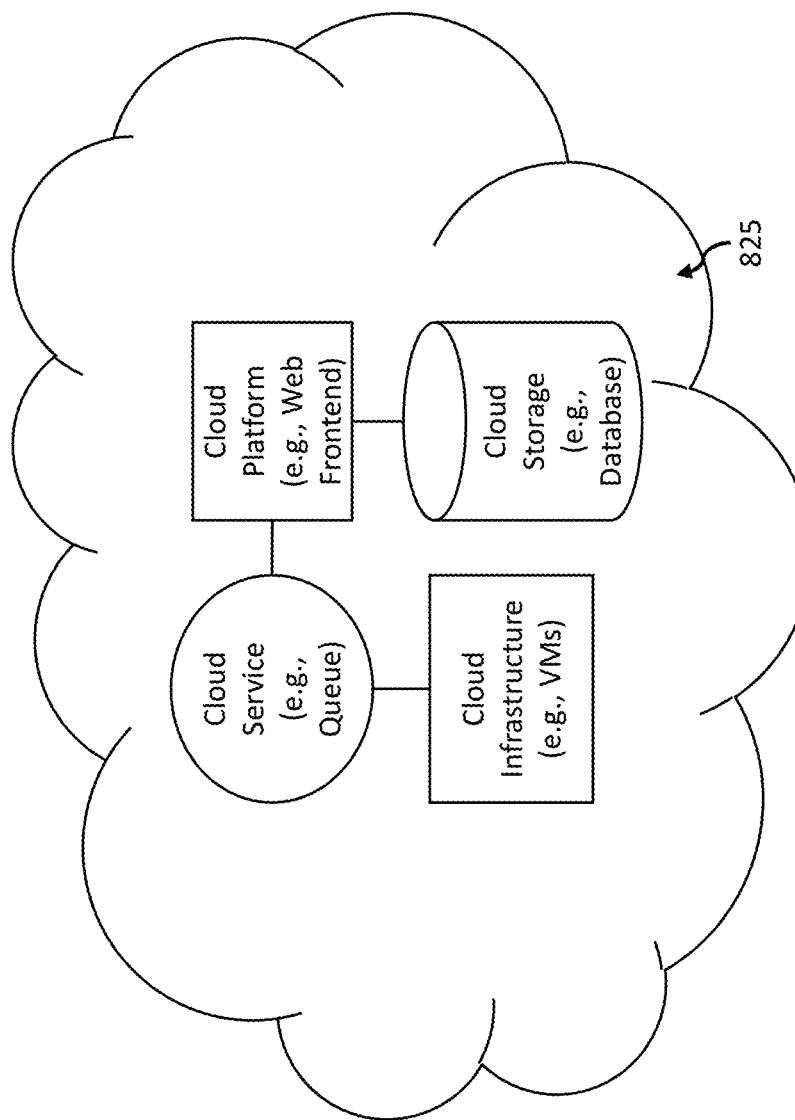
Figure 10:
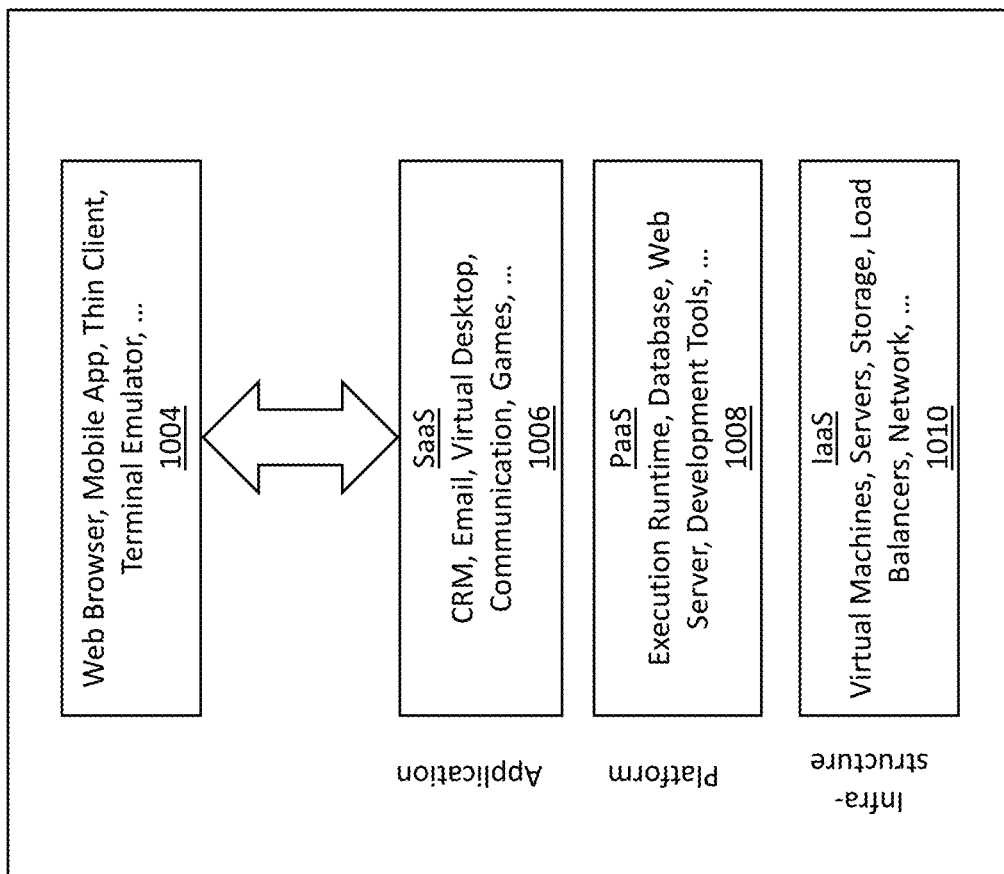

In some embodiments, the exemplary inventive computer-based systems/platforms, the exemplary inventive computer-based devices, and/or the exemplary inventive computer-based components of the present disclosure may be specifically configured to operate in a cloud computing/architecture 825 such as, but not limiting to: infrastructure a service (IaaS) 1010, platform as a service (PaaS) 1008, and/or software as a service (SaaS) 1006 using a web browser, mobile app, thin client, terminal emulator or other endpoint 1004. FIGS. 9 and 10 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9, 999), at least 10,000 (e.g., but not limited to, 10,000-99, 999), at least 100,000 (e.g., but not limited to, 100,000-999, 999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999, 999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A system for granular user data management, comprising:
 at least one processor configured to execute software instructions that cause the at least one processor to perform steps to:
  receive operator data comprising a plurality of activity entries that record data representative of activities performed by users on the at least one operator system;
  determine at least one individual account of a plurality of individual accounts associated with each activity entry of the plurality of activity entries based on at least one individual identifier of the each activity entry and an account individual identifier identifying the at least one individual account;
  generate at least one account link linking the each activity entry of the plurality of activity entries with the at least one individual account associated with the each activity entry;
  attribute the each activity entry to an operator account in an aggregate account database, the operator account comprising an aggregate operator value associated with the plurality of activity entries in the record of activities;
  determine a risk of the each individual account based on a reconciliation of the record of activities; and
  display an activity dashboard on a display of at least one operator computing device, wherein the activity dashboard depicts the risk of the each individual account on the display of the at least one operator computing device.

2. The system as recited in claim 1, wherein the at least one processor is further configured to execute the software instruction to perform further steps to determine an aggregate account risk based at least in part on the risk of the each individual account.

3. The system as recited in claim 1, wherein the at least one processor is further configured to execute the software instruction to perform further steps to:
   determine a compliance of the each individual account based on a compliance management of the record of activities; and
   display the compliance of the each individual account in the activity dashboard on the display of the at least one operator computing device.

4. The system as recited in claim 1, wherein the plurality of activity entries are stored in the aggregate account database separately from the operator account.

5. The system as recited in claim 1, wherein the plurality of activity entries are stored separately from aggregate account database.

6. The system as recited in claim 1, wherein the at least one individual account comprises a ledger of the each activity entry of the plurality of activity entries.

7. The system as recited in claim 1, wherein the at least one processor is further configured to:
   determine that a particular activity entry of the plurality of account entries comprises an account creation request;
   automatically generate the at least one individual account associated with the each activity entry based on the account creation request; and
   automatically instruct the aggregate account database to open at least one financial account linked to the at least one individual account.

8. A method for granular user data management, comprising:
   receiving, by at least one processor, operator data comprising a plurality of activity entries that record data representative of activities performed by users on at least one operator system;
   determining, by the at least one processor, at least one individual account of a plurality of individual accounts associated with each activity entry of the plurality of activity entries based on at least one individual identifier of the each activity entry and an account individual identifier identifying the at least one individual account;
   generating, by the at least one processor, at least one account link linking the each activity entry of the plurality of activity entries with the at least one individual account associated with the each activity entry;
   attributing, by the at least one processor, the each activity entry to an operator account in an aggregate account database, the operator account comprising an aggregate operator value associated with the plurality of activity entries in the record of activities;
   determining, by the at least one processor, a risk of the each individual account based on a reconciliation of the record of activities; and
   displaying, by the at least one processor, an activity dashboard on a display of at least one operator computing device, wherein the activity dashboard depicts the risk of the each individual account on the display of the at least one operator computing device.

9. The method as recited in claim 8, further comprising executing, by the at least one processor, determining an aggregate account risk based at least in part on the risk of the each individual account.

10. The method as recited in claim 8, further comprising:
    determining, by the at least one processor, a compliance of the each individual account based on a compliance management of the record of activities; and
    displaying, by the at least one processor, the compliance of the each individual account in the activity dashboard on the display of the at least one operator computing device.

11. The method as recited in claim 8, wherein the plurality of activity entries are stored in the aggregate account database separately from the operator account.

12. The method as recited in claim 8, wherein the plurality of activity entries are stored separately from aggregate account database.

13. The method as recited in claim 8, wherein the at least one individual account comprises a ledger of the each activity entry of the plurality of activity entries.

14. The method as recited in claim 8, further comprising:
    determining, by the at least one processor, that a particular activity entry of the plurality of account entries comprises an account creation request;
    automatically generating, by the at least one processor, the at least one individual account associated with the each activity entry based on the account creation request; and
    automatically instructing, by the at least one processor, the aggregate account database to open at least one financial account linked to the at least one individual account.

15. A non-transitory computer readable medium having software instructions stored thereon, the software instructions configured to cause at least one processor to perform steps comprising:
    receiving operator data from at least one operator system, operator data comprising a plurality of activity entries that record data representative of activities performed by users on the at least one operator system;
    determining at least one individual account of a plurality of individual accounts associated with each activity entry of the plurality of activity entries based on at least one individual identifier of each activity entry of the plurality of activity entries and an account individual identifier identifying the at least one individual account;
    generating at least one account link linking the each activity entry of the plurality of activity entries with the at least one individual account associated with the each activity entry;
    attributing the each activity entry to an operator account in an aggregate account database, the operator account comprising an aggregate operator value associated with the plurality of activity entries in the record of activities;
    determining a risk of the each individual account based on a reconciliation of the record of activities; and
    displaying an activity dashboard on a display of at least one operator computing device, wherein the activity dashboard depicts the risk of the each individual account on the display of the at least one operator computing device.

16. The non-transitory computer readable medium as recited in claim 15, wherein the software instructions are further configured to cause the at least one processor to perform steps comprising perform further steps to determine an aggregate account risk based at least in part on the risk of the each individual account.

17. The non-transitory computer readable medium as recited in claim 15, wherein the software instructions are further configured to cause the at least one processor to perform steps comprising:
   determining a compliance of the each individual account based on a compliance management of the record of activities; and
   displaying the compliance of the each individual account in the activity dashboard on the display of the at least one operator computing device.

18. The non-transitory computer readable medium as recited in claim 15, wherein the plurality of activity entries are stored separately from at least one of:
   the aggregate account database, or
   the operator account in the aggregate account database.

19. The non-transitory computer readable medium as recited in claim 15, wherein the at least one individual account comprises a ledger of the each activity entry of the plurality of activity entries.

20. The non-transitory computer readable medium as recited in claim 15, wherein the software instructions are further configured to cause the at least one processor to perform steps comprising:
   determine that a particular activity entry of the plurality of account entries comprises an account creation request;
   automatically generate the at least one individual account associated with the each activity entry based on the account creation request; and
   automatically instruct the aggregate account database to open at least one financial account linked to the at least one individual account.

* * * * *